United States Patent
Maeda et al.

(10) Patent No.: US 12,264,959 B2
(45) Date of Patent: Apr. 1, 2025

(54) WEIGHING DEVICE

(71) Applicant: ISHIDA CO., LTD., Kyoto (JP)

(72) Inventors: Shuichi Maeda, Ritto (JP); Masaaki Hojo, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 511 days.

(21) Appl. No.: 17/761,947

(22) PCT Filed: Jul. 31, 2020

(86) PCT No.: PCT/JP2020/029431
§ 371 (c)(1),
(2) Date: Mar. 18, 2022

(87) PCT Pub. No.: WO2021/059744
PCT Pub. Date: Apr. 1, 2021

(65) Prior Publication Data
US 2022/0333974 A1 Oct. 20, 2022

(30) Foreign Application Priority Data
Sep. 26, 2019 (JP) .................... 2019-175388

(51) Int. Cl.
| | | |
|---|---|---|
| *G01G 21/28* | (2006.01) | |
| *B25J 13/08* | (2006.01) | |
| *G01G 19/387* | (2006.01) | |

(52) U.S. Cl.
CPC ............ *G01G 21/28* (2013.01); *B25J 13/085* (2013.01); *G01G 19/387* (2013.01)

(58) Field of Classification Search
USPC ........................................................ 177/180
See application file for complete search history.

(56) References Cited

U.S. PATENT DOCUMENTS

| | | | | | |
|---|---|---|---|---|---|
| 4,420,051 A | * | 12/1983 | Furuta | ................. | G01G 19/393 |
| | | | | | 177/52 |
| 4,789,292 A | * | 12/1988 | Holcomb | ............. | B25J 15/0253 |
| | | | | | 29/709 |

(Continued)

FOREIGN PATENT DOCUMENTS

| | | |
|---|---|---|
| JP | H03-202720 A | 9/1991 |
| JP | H06-3182 A | 1/1994 |

(Continued)

OTHER PUBLICATIONS

International Search Report issued in PCT/JP2020/029431; mailed Oct. 13, 2020.

(Continued)

*Primary Examiner* — Jacques M Saint Surin
(74) *Attorney, Agent, or Firm* — Studebaker Brackett PLLC

(57) ABSTRACT

It is an object of the present invention to provide a weighing device in which dropping of articles from gripping means and reductions in weighing precision are suppressed. In a weighing device (100), when at least one of an operation state of grippers (30) and weighing results from weighing units (40) fulfills any condition from among "a weight value of articles (A) weighed by the weighing units (40) not being a preset target weight value," "an operating distance in an operation in which the articles (A) are held by gripping members (32) being greater than a prescribed range," and "the operating distance in the operation in which the articles (A) are held by the gripping members (32) being less than the prescribed range," the articles (A) gripped by the grippers (30) are returned to an article group accommodation container (52) by a control unit (70) without said articles (A) being discharged to a discharge chute. As a result, a situation where the grippers (30) operate while still holding "articles (Continued)

for which the weight value is not the target weight value" is avoided.

12 Claims, 14 Drawing Sheets

(56) References Cited

U.S. PATENT DOCUMENTS

| | | | |
|---|---|---|---|
| 5,004,093 A | | 4/1991 | Blezard |
| 5,321,212 A | * | 6/1994 | Wadell ................. G01G 19/393 177/25.18 |
| 6,293,750 B1 | * | 9/2001 | Cohen ................. G01N 35/0099 901/17 |
| 6,371,717 B1 | * | 4/2002 | Grams ................. B25J 15/0052 294/81.61 |
| 6,374,982 B1 | * | 4/2002 | Cohen ................. G01N 35/0099 901/17 |
| 2013/0110280 A1 | | 5/2013 | Folk |
| 2014/0158438 A1 | | 6/2014 | Clark |
| 2018/0340819 A1 | | 11/2018 | Taira |
| 2021/0114227 A1 | * | 4/2021 | Hirata ..................... B25J 15/10 |

FOREIGN PATENT DOCUMENTS

| | | |
|---|---|---|
| JP | H08-145773 A | 6/1996 |
| JP | 2001-310284 A | 11/2001 |
| JP | 2012-240182 A | 12/2012 |
| JP | 2018-112429 A | 7/2018 |
| JP | 2018-153884 A | 10/2018 |
| JP | 2019-126876 A | 8/2019 |
| JP | 7027030 B2 | 3/2022 |
| JP | 7044366 B2 | 3/2022 |

OTHER PUBLICATIONS

Written Opinion of the International Searching Authority issued in PCT/JP2020/029431; mailed Oct. 13, 2020.

"Information Statement" submitted by a third party and mailed by the Japanese Patent Office on Dec. 5, 2023, which corresponds to Japanese Patent Application No. 2019-175388 and is related to U.S. Appl. No. 17/761,947; with English translation of reasons for submission.

The extended European search report issued by the European Patent Office on Oct. 27, 2022, which corresponds to European Patent Application No. 20867361.6-1001 and is related to U.S. Appl. No. 17/761,947.

An Office Action mailed by the State Intellectual Property Office of the People's Republic of China on Jul. 5, 2024, which corresponds to Chinese Patent Application No. 202080067350.3 and is related to U.S. Appl. No. 17/761,947; with English language translation.

An Office Action; "Notice of Reasons for Refusal," mailed by the Japanese Patent Office on Jan. 30, 2024, which corresponds to Japanese Patent Application No. 2019-175388 and is related to U.S. Appl. No. 17/761,947; with English language translation.

An Information Statement submitted by the third party to the Japanese Patent Office on Jun. 21, 2023, which corresponds to Japanese Patent Application No. 2019-175388; with English translation of "Reasons for Submission" of the Information Statement.

* cited by examiner

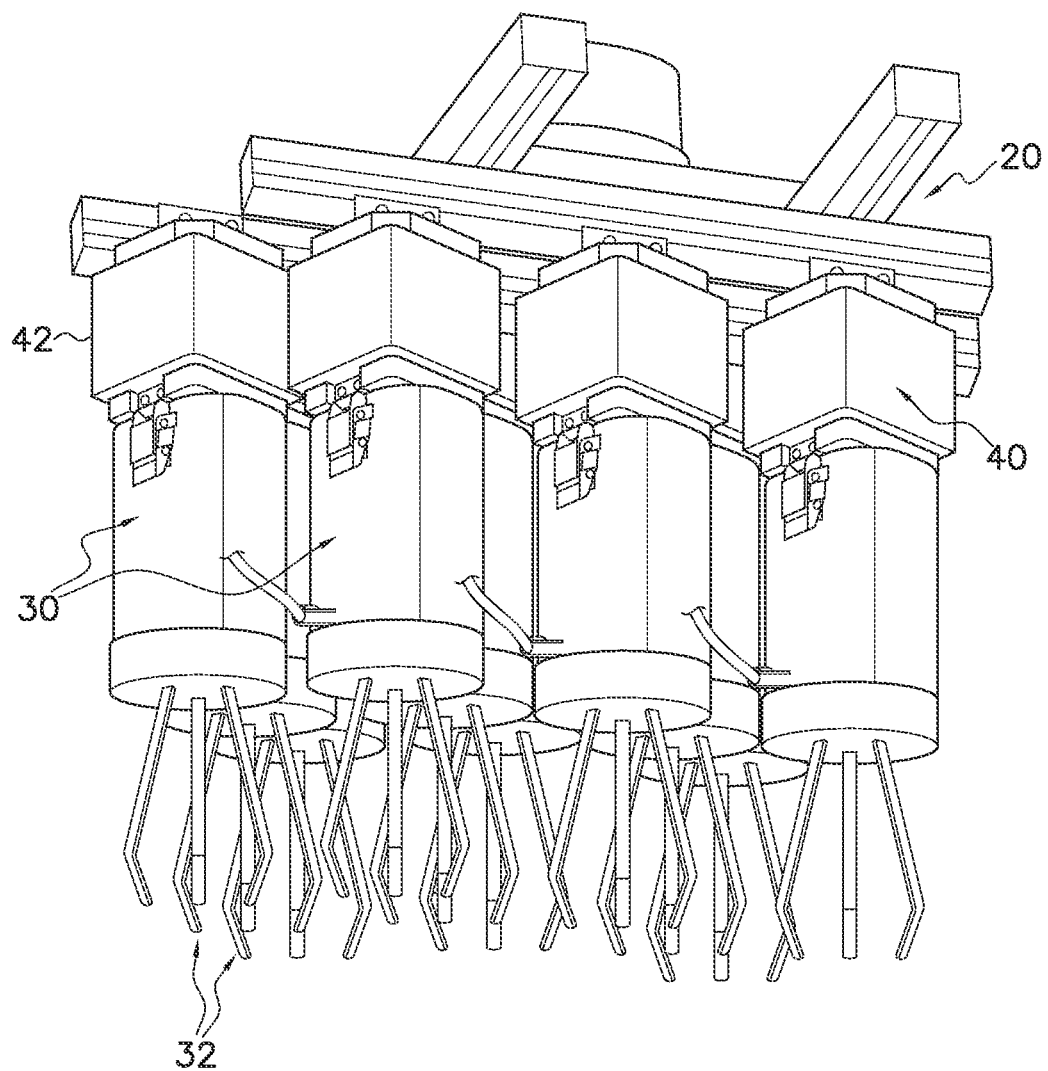
F I G. 4

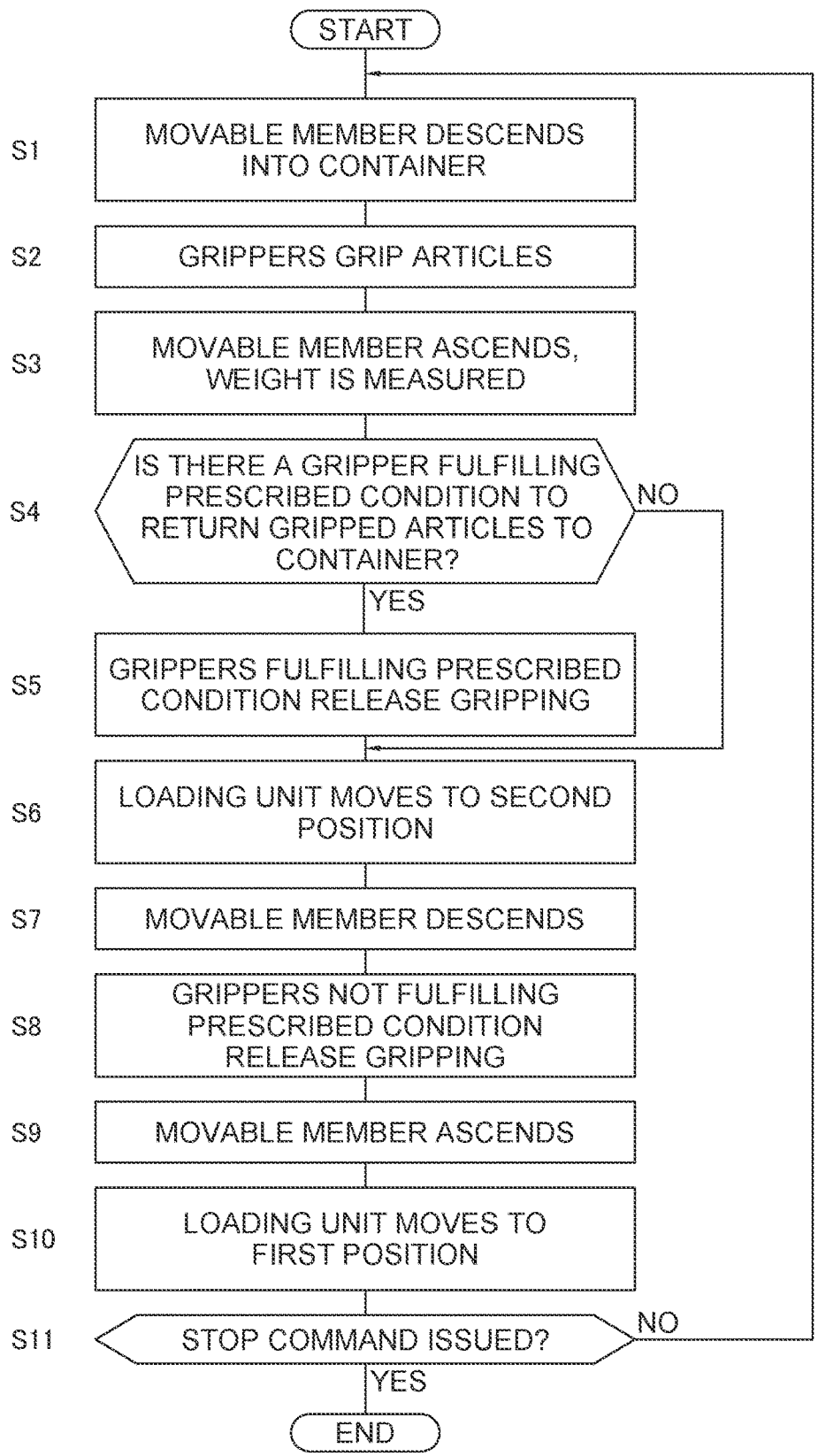
F I G. 7A

WEIGHING DEVICE

TECHNICAL FIELD

The present invention relates to a weighing device that weighs articles of an article group accommodated in a container.

BACKGROUND ART

Patent Document 1 (Japanese Laid-Open Patent Publication No. H6-3182) discloses, as a weight-measuring and distributing device, a device having gripping means to grip and eliminate a portion of a product, and a plurality of gathering units individually provided with weight-measuring means to record the weight of the portion of the product.

The device is furthermore provided with distribution means, and a computer programmed in advance for the purpose of a prescribed total weight, the device measuring the weight of articles gripped by the gripping means using the weight-measuring means, and performing combinatorial weighing on the basis of measured weight values.

SUMMARY OF THE INVENTION

Technical Problem

However, when the articles are articles that readily spill out, such as food ingredients, there is a concern that food ingredients could drop from gripping means that are not participating in a combination; in such instances, the food ingredients that dropped could mix with combinatorially weighed food ingredients and reduce weighing precision.

Thus, an object of the present invention is to provide a weighing device in which dropping of articles from gripping means and reductions in weighing precision are suppressed.

Solution to Problem

A weighing device according to a first aspect of the present invention is a weighing device that weighs articles of an article group accommodated in a container, the weighing device comprising a robot arm, a gripping unit, a weighing unit, and a control unit. The gripping unit is attached to a distal end of the robot arm, and grips a portion of the articles from the article group within the container. The weighing unit measures a weight value of the articles gripped by the gripping unit. The control unit controls operation of the gripping unit. Moreover, when a prescribed condition is fulfilled by at least one of an operation state of the gripping unit and a weighing result from the weighing unit, the articles gripped by the gripping unit are returned to the container by the control unit without said articles being discharged to a target discharge destination.

In this weighing device, performing a control in which, "when a prescribed condition is fulfilled articles gripped by a gripping unit are returned to a container without being discharged to a target discharge destination" avoids a situation where the gripping unit operates while still holding "articles that are not to be discharged." As a result, dropping of articles from the gripping unit and reductions in weighing precision are suppressed.

A weighing device according to a second aspect of the present invention is the weighing device according to the first aspect, wherein the weighing device furthermore comprises a plurality of the gripping units, and a plurality of the weighing units. When a prescribed condition is fulfilled by at least one of the operation state of any gripping unit from among the plurality of gripping units and the weighing result from the weighing unit corresponding to said gripping unit, the articles gripped by the gripping unit fulfilling the prescribed condition are returned to the container by the control unit without said articles being discharged to the discharge destination.

A weighing device according to a third aspect of the present invention is the weighing device according to the first aspect, wherein the weighing device furthermore comprises a plurality of the gripping units, a plurality of the weighing units, and a discharge chute. The articles discharged from the gripping units are received in and then discharged from the discharge chute. The control unit carries out a combination calculation using the weight value of the articles gripped by each of the plurality of gripping units, and selects a combination for which a preset target weight value is reached. Furthermore, when a prescribed condition is fulfilled by the weighing result from a weighing unit corresponding to at least one gripping unit from among the plurality of gripping units, the articles gripped by the gripping unit fulfilling the prescribed condition are returned to the container by the control unit, whereupon articles gripped by gripping units that do not fulfill the prescribed condition are discharged to the discharge chute by the control unit.

The weighing device according to a fourth aspect of the present invention is the weighing device according to the first aspect or the second aspect, wherein the prescribed condition includes the weight value of the articles weighed by the weighing unit not being a preset target weight value.

In this weighing device, a situation where the gripping unit operates while still holding "articles for which the weight value is not the target weight value" is avoided. As a result, dropping of articles from the gripping unit and reductions in weighing precision are suppressed. Furthermore, wasteful operation is eliminated, and production efficiency can be improved.

The weighing device according to a fifth aspect of the present invention is the weighing device according to the first aspect or the second aspect, wherein the prescribed condition includes an operating distance in an operation in which the articles are held by the gripping unit being greater than a prescribed range.

Here, "an operating distance in an operation in which the articles are held by the gripping unit being greater than a prescribed range" is specifically described. For example, when a gripping unit sandwiches and holds an article between a plurality of gripping members, a range bounded by a smallest inscribed circle with respect to the gripping members when an article that matches a lower-limit value of the target weight value is sandwiched, and by a smallest inscribed circle with respect to the gripping members when an article that matches an upper-limit value of the target weight value is sandwiched, is a prescribed range in which the target weight value is satisfied.

Therefore, the smallest inscribed circle with respect to the gripping members when an article that exceeds the upper-limit value of the target weight value is sandwiched is positioned further outward than the prescribed range as viewed from a circle center. Specifically, this signifies that a position (coordinates) reached by the gripping members is further outward than a position (coordinates) reached by gripping members sandwiching an article that matches the upper-limit value of the target weight value.

In such instances, it is assessed that "the operating distance in an operation in which the articles are held by the gripping unit is greater than a prescribed range."

However, if the gripping members are in a fully open state when the gripping operation starts, then the operating distance by which the gripping members are operated will be lower when the weight value of articles being gripped is greater than the target weight value than when articles having the target weight value are gripped. Thus, when the operating distance is conceived of as "displacement" with reference to the fully open state of the gripping members, "the operating distance in an operation in which the articles are held by the gripping unit being less than the prescribed range" signifies that the weight value of said articles is greater than the target weight value.

In this weighing device, the operating distance in an operation in which the articles are held by the gripping unit being greater than the prescribed range signifies that the weight value of said articles is not the target weight value. Thus, a situation where the gripping unit operates while still holding "articles for which the weight value is not the target weight value" is avoided. As a result, dropping of articles from the gripping unit and reductions in weighing precision are suppressed. Furthermore, wasteful operation is eliminated, and production efficiency can be improved.

The weighing device according to a sixth aspect of the present invention is the weighing device according to the first aspect or the second aspect, wherein the prescribed condition includes an operating distance in an operation in which the articles are held by the gripping unit being less than a prescribed range.

Here, "an operating distance in an operation in which the articles are held by the gripping unit being less than a prescribed range" is specifically described. For example, when a gripping unit sandwiches and holds an article between a plurality of gripping members, a range bounded by a smallest inscribed circle with respect to the gripping members when an article that matches a lower-limit value of the target weight value is sandwiched, and by a smallest inscribed circle with respect to the gripping members when an article that matches an upper-limit value of the target weight value is sandwiched, is a prescribed range in which the target weight value is satisfied.

Therefore, the smallest inscribed circle with respect to the gripping members when an article that is below the lower-limit value of the target weight value is sandwiched is positioned further inward than the prescribed range as viewed from a circle center. Specifically, this signifies that a position (coordinates) reached by the gripping members is further inward than a position (coordinates) reached by gripping members sandwiching an article that matches the lower-limit value of the target weight value.

In such instances, it is assessed that "the operating distance in an operation in which the articles are held by the gripping unit is less than a prescribed range."

However, if the gripping members are in a fully open state when the gripping operation starts, then the operating distance by which the gripping members are operated will be greater when the weight value of articles being gripped is less than the target weight value than when articles having the target weight value are gripped.

Thus, when the operating distance is conceived of as "displacement" with reference to the fully open state of the gripping members, "the operating distance in an operation in which the articles are held by the gripping unit being greater than the prescribed range" signifies that the weight value of said articles is less than the target weight value.

In this weighing device, the operating distance in an operation in which the articles are held by the gripping unit being less than the prescribed range signifies that the weight value of said articles is not the target weight value. Thus, a situation where the gripping unit operates while still holding "articles for which the weight value is not the target weight value" is avoided. As a result, wasteful operation is eliminated, and production efficiency can be improved.

The weighing device according to a seventh aspect of the present invention is the weighing device according to the fifth aspect or the sixth aspect, wherein the gripping units have at least two claws to grasp the articles. The operating distance is the degree to which the two claws open.

For example, a range bounded by a smallest inscribed circle with respect to the claws when an article that matches a lower-limit value of the target weight value is sandwiched, and by a smallest inscribed circle with respect to the claws when an article that matches an upper-limit value of the target weight value is sandwiched, is a prescribed range in which the target weight value is satisfied.

Therefore, the smallest inscribed circle with respect to the claws when an article that exceeds the upper-limit value of the target weight value is sandwiched is positioned further outward than the prescribed range as viewed from the circle center. Specifically, this signifies that a position (coordinates) reached by the claws is further outward than a position (coordinates) reached by claws sandwiching an article that matches the upper-limit value of the target weight value. In such instances, it is assessed that "the opening degree between the two claws is greater than the prescribed range."

Conversely, the smallest inscribed circle with respect to the claws when an article that is below the lower-limit value of the target weight value is sandwiched is positioned further inward than the prescribed range as viewed from the circle center. Specifically, this signifies that a position (coordinates) reached by the claws is further inward than a position (coordinates) reached by claws sandwiching an article that matches the lower-limit value of the target weight value. In such instances, it is assessed that "the opening degree between the two claws is less than the prescribed range."

However, if the two claws are in a fully open state when the gripping operation starts, then the operating distance by which the claws are operated will be lower when the weight value of articles being gripped is greater than the target weight value than when articles having the target weight value are gripped. Thus, when the operating distance is conceived of as "displacement" with reference to the fully open state of the claws, "the operating distance in an operation in which the articles are held by the claws being less than the prescribed range" signifies that the weight value of said articles is greater than the target weight value.

Moreover, if the two claws are in a fully open state when the gripping operation starts, then the operating distance by which the claws are operated will be greater when the weight value of articles being gripped is less than the target weight value than when articles having the target weight value are gripped.

Thus, when the operating distance is conceived of as "displacement" with reference to the fully open state of the claws, "the operating distance in an operation in which the articles are held by the claws being greater than the prescribed range" signifies that the weight value of said articles is less than the target weight value.

In this weighing device, the opening degree between the two claws being greater than the prescribed range signifies that the weight value of the articles gripped thereby is greater than the target weight value. Moreover, the opening degree between the two claws being less than the prescribed range signifies that the weight value of the articles gripped thereby is less than the target weight value. Thus, a situation where the gripping unit operates while still holding "articles for which the weight value is not the target weight value" is avoided. As a result, dropping of articles from the gripping unit and reductions in weighing precision are suppressed. Furthermore, wasteful operation is eliminated, and production efficiency can be improved.

The weighing device according to an eighth aspect of the present invention is the weighing device according to the third aspect, wherein the prescribed condition includes the weighing result not being selected for the combination for which the target weight value is reached.

In this weighing device, articles gripped by gripping units not selected for the combination are returned to the container, whereupon articles gripped by gripping units selected for the combination are discharged to the discharge chute. Therefore, articles gripped by gripping units not selected for the combination do not spill out from the gripping units and are not discharged to the discharge chute, and weighing precision can be improved.

The weighing device according to a ninth aspect of the present invention is the weighing device according to the eighth aspect, wherein when there is no combination for which the target weight value is reached, the control unit discharges all of the articles gripped by the gripping units to the container.

The weighing device according to a tenth aspect of the present invention is the weighing device according to any of the first to ninth aspects, wherein, when returning the articles gripped by the gripping unit to the container, the control unit causes the gripping unit and the container to move relative to each other.

In this weighing device, if articles are returned to the previous location at which the articles were grasped, it is not very likely that a suitable amount will be obtained when articles are subsequently grasped; therefore, moving the gripping unit and the container relative to each other and shifting the locations at which articles are returned raises the likelihood of grasping a suitable amount of articles.

The weighing device according to an eleventh aspect of the present invention is the weighing device according to any of the first to ninth aspects, wherein the container is capable of moving in horizontal first and second directions that are orthogonal to each other. When returning the articles gripped by the gripping unit to the container, the control unit causes the gripping unit and the container to move relative to each other in either of the first and second directions.

In this weighing device, the articles are returned to the container once the positional relationship between the gripping unit and the container is ascertained using planar coordinates, and therefore the articles can be returned in such a manner that the distribution of articles in the container is uniform.

The weighing device according to a twelfth aspect of the present invention is the weighing device according to any of the first to ninth aspects, wherein at least one of the gripping unit and the container is capable of rotating about a vertical axis. The control unit causes the gripping unit and the container to perform relative rotation by a prescribed angle in plan view.

Advantageous Effects of Invention

In the weighing device according to the present invention, performing a control in which, "when a prescribed condition is fulfilled articles gripped by a gripping unit are returned to a container without being discharged to a target discharge destination" avoids a situation where the gripping unit operates while still holding "articles that are not to be discharged." As a result, dropping of articles from the gripping unit and reductions in weighing precision are suppressed.

BRIEF DESCRIPTION OF THE DRAWINGS

FIG. 4 is a schematic perspective view of the movable member, the weighing unit, and the grippers of the weighing device of FIG. 1.

FIG. 7A is a flowchart for explaining the operation of a weighing device according to a first embodiment.

DESCRIPTION OF EMBODIMENTS

Figure 1:
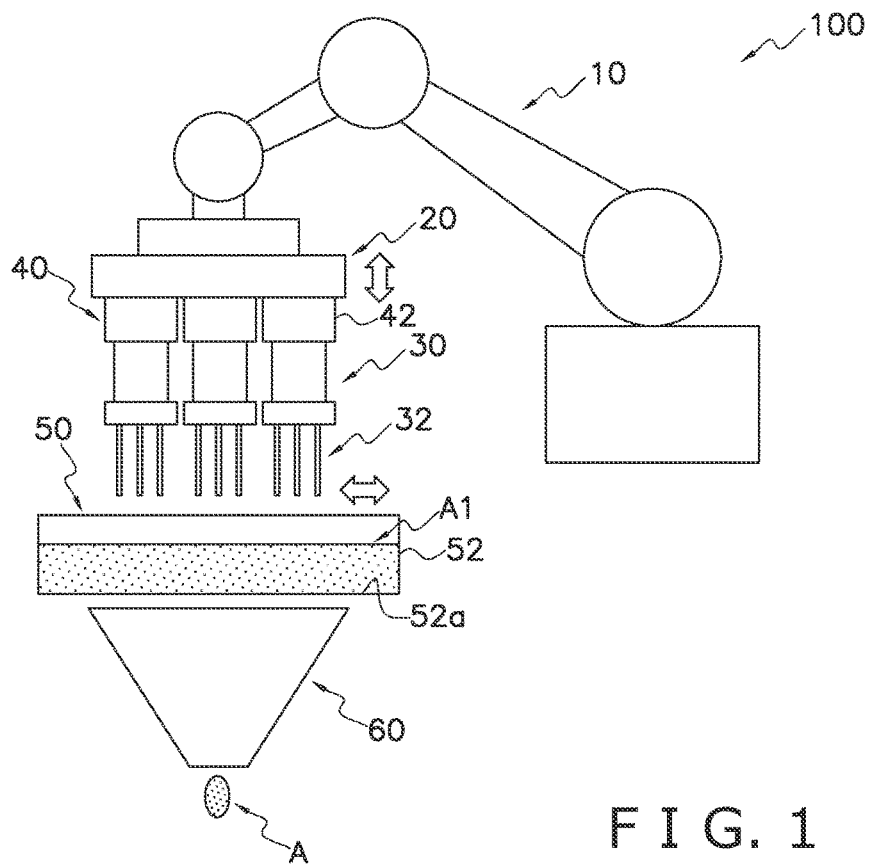
FIG. 1 is a schematic view of a weighing device according to one embodiment of the present invention.

Embodiments of the present invention will be described while referring to the drawings. The embodiments described below are specific examples of the present invention, and are not intended to limit the technical scope of the present invention.

First Embodiment (1) Configuration of Weighing Device 100

Figure 2:
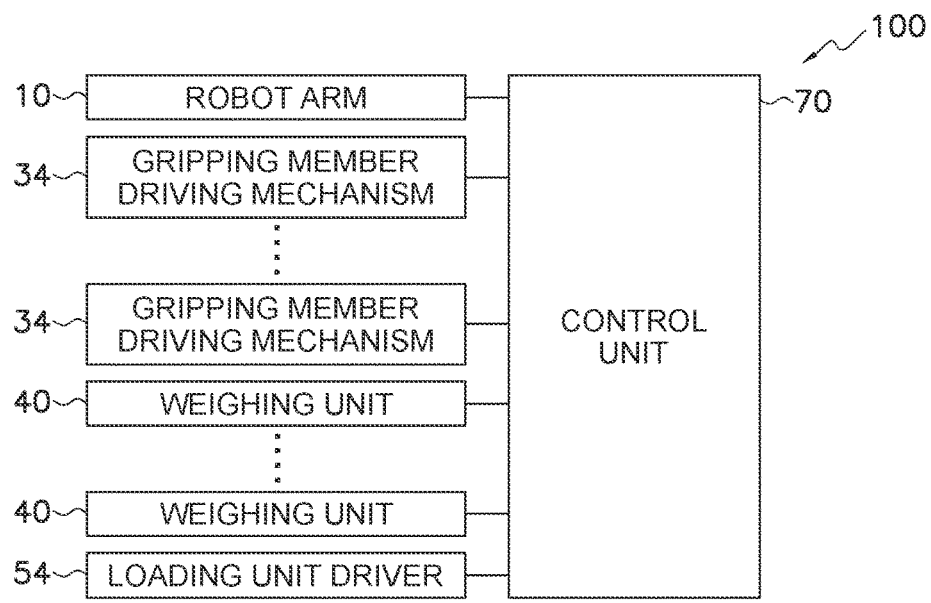
FIG. 2 is a block diagram of the weighing device of FIG. 1.

FIG. 1 is a schematic view of a weighing device 100. FIG. 2 is a block diagram of the weighing device 100. In FIGS. 1 and 2, the weighing device 100 extracts and discharges a portion of articles A from an article group A1, which is a collection of articles A.

Specifically, the weighing device 100 extracts and discharges a portion of the articles A from the article group A1 such that a weight reaches a target weight range. The articles A discharged by the weighing device 100 are, e.g., packaged in a bag or accommodated in a container, and then shipped as goods in steps following the weighing device 100.

The weighing device 100 is provided with a robot arm 10, a movable member 20, a gripper 30, a weighing unit 40, a loading unit 50, a loading unit driver 54, a discharge chute 60, and a control unit 70. The control unit 70 carries out various calculations and controls the operation of each part of the weighing device 100.

The article group A1 is loaded in the loading unit 50. The article A is, e.g., a food product. Moreover, the article A may be, for example, spaghetti or other noodles, and/or a highly sticky food product such as a food product including a large amount of sugar.

The loading unit 50 is moved, by the loading unit driver 54, between a first position at which the gripper 30 grips the article A of the article group A1 loaded into the loading unit 50, and a second position at which the gripper 30 is not gripping the article A from the article group A1 loaded into the loading unit 50.

Each gripper 30 has a gripping member 32 to grip the articles A. The gripper 30 is attached to the movable member 20. In the present embodiment, a plurality of grippers 30 are attached to the movable member 20.

The robot arm 10 moves the movable member 20 to which the grippers 30 are attached. The weighing unit 40 measures a weight value of the articles A gripped by each gripper 30. The articles A for which gripping by the grippers 30 has been released are received in and then discharged from the discharge chute 60.

The control unit 70 controls the operation of the various constituents of the weighing device 100 including the loading unit driver 54, a gripping member driving mechanism 34, and the robot arm 10, and/or carries out a combination calculation, etc., that utilizes the weight values of the articles A weighed by the weighing unit 40.

The control unit 70 controls the operation of the robot arm 10 to move the movable member 20 and bring the grippers 30 close to the loading unit 50 placed at the first position and loaded with the article group A1. The control unit 70 controls a gripping member driving mechanism 34 of each gripper 30, and causes the gripping members 32 of each gripper 30 to grip a portion of the articles A of the article group A1 loaded in the loading unit 50.

Each weighing unit 40 measures a weight value of the articles A gripped by the gripper 30 corresponding to the weighing unit 40 thereof. The control unit 70 carries out a combination calculation on the basis of the weight values of the articles A gripped by the grippers 30, each weight value being measured by the respective weighing unit 40.

The combination calculation is a process of finding a combination of weight values for which a total value thereof reaches a target weight range when the weight values of the articles A gripped by each of the grippers 30 are added together. On the basis of the result of the combination calculation, the control unit 70 causes the gripping members 32 of the grippers 30 corresponding to a combination of weight values for which the target weight range is reached to release gripping of the articles A from above the discharge chute 60 and thereby discharge the articles A of the target weight range from the discharge chute 60.

(2) Detailed Configuration

Figure 3:
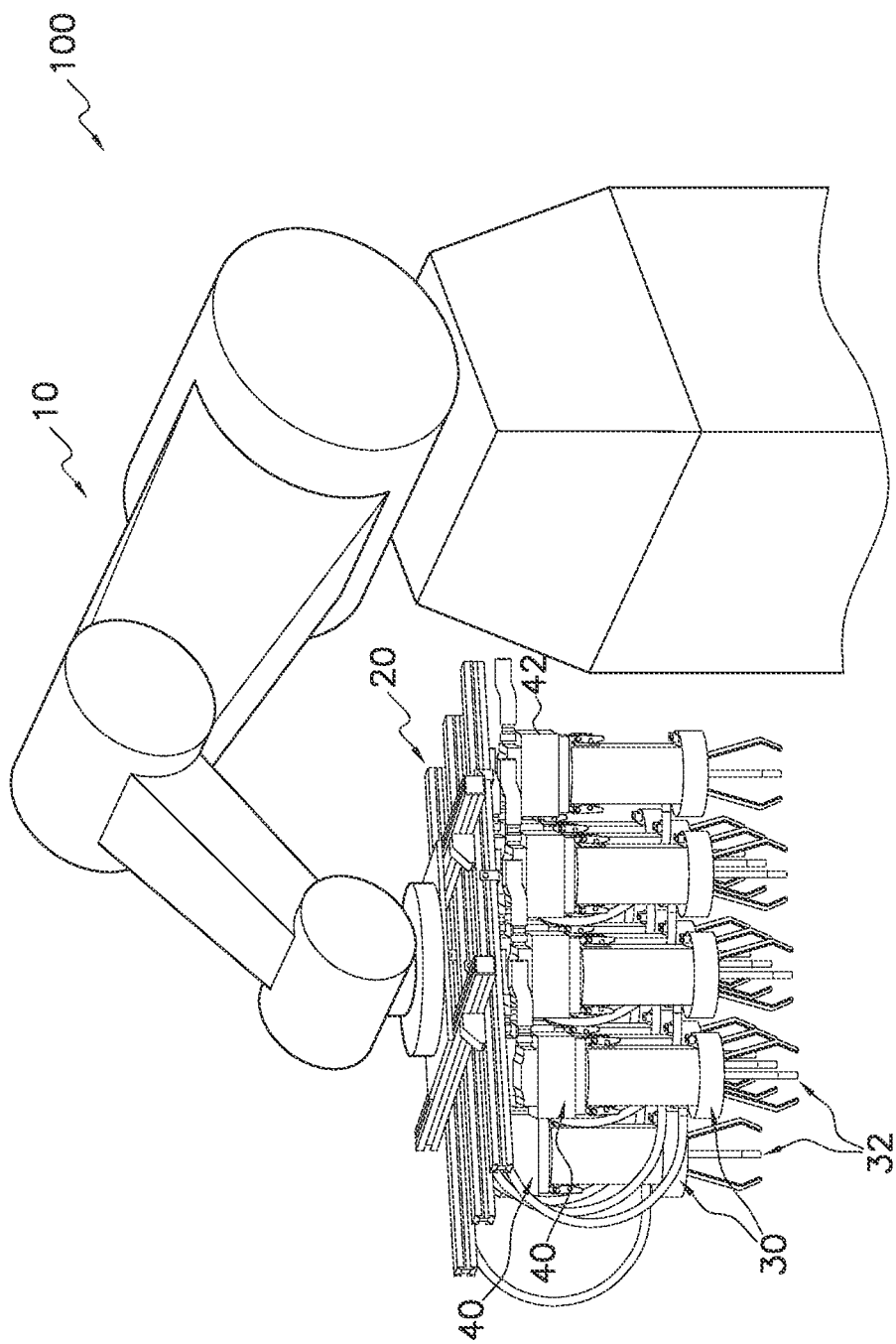
FIG. 3 is a schematic perspective view of a robot, a movable member, a weighing unit, and grippers of the weighing device of FIG. 1.
Figure 5A:
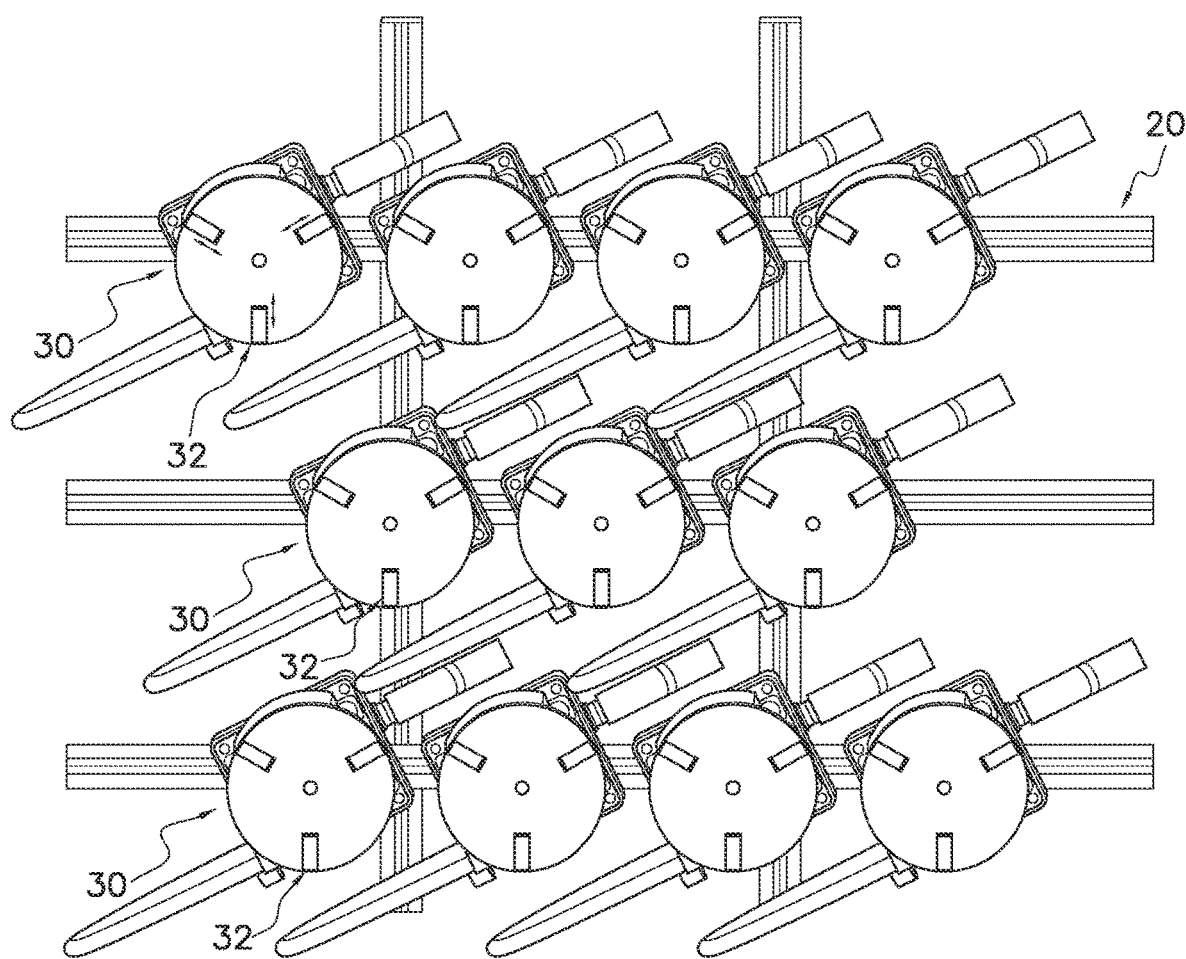
FIG. 5A is a bottom surface view in which the movable member to which the grippers of the weighing device of FIG. 1 are attached is viewed from a gripping-member side of the grippers.
Figure 5B:
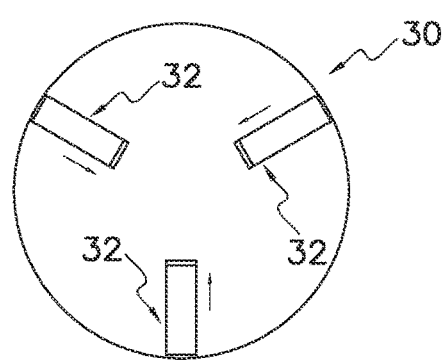
FIG. 5B is a bottom surface view of one gripper of FIG. 5A as viewed from below gripping members of the one gripper, and depicts the gripping members positioned in distant positions in a state prior to gripping an article or after releasing the gripping of the article.
Figure 5C:
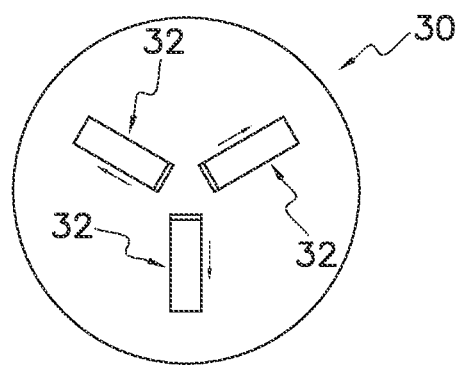
FIG. 5C is a bottom surface view of the one gripper of FIG. 5A as viewed from below the gripping members of the gripper, and depicts the gripping members positioned in close positions when gripping an article.

FIG. 3 is a schematic perspective view of the robot arm 10, the movable member 20, the weighing unit 40, and the grippers 30. FIG. 4 is a schematic perspective view of the movable member 20, the weighing unit 40, and the grippers 30. FIG. 5A is a bottom surface view in which the movable member 20 to which the grippers 30 are attached is viewed from the gripping-member 32 side of the grippers 30 (from below). FIGS. 5B and 5C are bottom surface views of one gripper 30 of FIG. 5A as viewed from below the gripping members 32 of the one gripper 30.

(2-1) Movable Member 20

The movable member 20 is a member to which the gripper 30 is attached. In the present embodiment, a plurality of grippers 30 are attached to the movable member 20. The movable member 20 is a frame supporting the grippers 30. The movable member 20 is a member that is moved by the robot arm 10.

Herein, the statement that "the gripper 30 is attached to the movable member 20" does not represent only an aspect in which the gripper 30 is directly attached to the movable member 20. Rather, this statement also includes an aspect in which the gripper 30 is attached to the movable member 20 via another member. In the present embodiment, the gripper 30 is attached to the movable member 20 via a sensor unit 42 of the weighing unit 40, as shown in FIG. 4.

(2-2) Robot Arm 10

The robot arm 10 is a device that supports the movable member 20, and moves the movable member 20. In the present embodiment, the robot arm 10 moves the movable member 20 along a single axis. Specifically, the robot arm 10 moves the movable member 20 up and down along a single axis extending in a vertical direction.

In the present embodiment, the robot arm 10 is an articulated robot like that illustrated in FIG. 1. However, the type of the robot arm 10 is not limited to an articulated robot, and the robot 10 need only be a device that can move the movable member 20 in a prescribed direction.

Moreover, in place of the robot arm 10, the weighing device 100 may have a cylinder that can move the movable member 20 in a prescribed direction. For example, the weighing device 100 may have, in place of the robot arm 10, a cylinder that can move the movable member 20 along a single axis.

(2-3) Gripper 30

The gripper 30 is a device for gripping the article A. Each gripper 30 has a gripping member 32, and a gripping member driving mechanism 34 as a driving mechanism to drive the gripping member 32. The gripping member driving mechanism 34 drives the gripping member 32 using, for example, a motor and/or fluid pressure as a driving source.

In the present embodiment, the gripping member 32 is a rod-shaped or finger-shaped member, as shown in FIG. 4. Each gripper 30 has a plurality (three in FIG. 4) of gripping members 32. The number and/or shape of the gripping members 32 depicted in FIG. 4, etc., are merely examples, and can be changed, as appropriate.

In the present embodiment, when each gripper 30 is viewed from the gripping-member 32 side, the plurality of gripping members 32 are aligned and disposed in a circumferential direction of the gripper 30, as shown in FIG. 5A. In addition, when each gripper 30 is viewed from the gripping-member 32 side, the plurality of gripping members 32 are aligned and disposed at generally equal intervals in the circumferential direction. Furthermore, the gripping members 32 can move in a radial direction of the gripper 30 when each gripper 30 is viewed from the gripping-member 32 side.

The gripper 30 causes gripping members 32 in a mutually separated state to shift radially inward through use of the gripping member driving mechanism 34 so that the gripping members 32 are in a mutually close state, as shown in FIGS. 5B and 5C, and thereby holds an article A between a plurality of gripping members 32 to grip the article A.

Furthermore, the gripper 30 releases the gripping of the article A by causing the gripping members 32 that are in the mutually close state to shift radially outward through use of the gripping member driving mechanism 34 so that the gripping members 32 are in a mutually separated state.

As shown in FIGS. 3, 4, and 5A, a plurality of grippers 30 are attached to the movable member 20. Each gripper 30 is attached to the movable member 20 via a sensor unit 42 of the weighing unit 40. The sensor unit 42 of the weighing unit 40 is disposed between the gripper 30 and the movable member 20 supporting the gripper 30.

In the example illustrated in FIGS. 3, 4 and 5A, eleven grippers 30 are attached to the movable member 20, but this is merely one example; the number of grippers 30 is not limited. The robot arm 10 moves the movable member 20 up and down, and the plurality of grippers 30 attached to the movable member 20 are thereby integrally moved up and down.

As shown in FIG. 5A, when the grippers 30 attached to the movable member 20 are viewed from the gripping-member 32 side, each gripper 30 has a substantially circular shape. In the present embodiment, when the grippers 30 attached to the movable member 20 are viewed from the gripping-member 32 side, the grippers 30 are disposed in a generally staggered shape. However, this arrangement is merely one example; the grippers 30 are not limited to being disposed in a staggered shape.

(2-4) Weighing Unit 40

In the weighing device 100, one weighing unit 40 is provided for each gripper 30. The weighing unit 40 measures a weight value of an article A gripped by the gripping members 32 of the corresponding gripper 30.

Each weighing unit 40 includes a sensor unit 42, and a control unit (not shown). Each gripper 30 is attached to the movable member 20 via a sensor unit 42, as shown in FIG. 4. The sensor unit 42 includes a force sensor and an acceleration sensor. For example, a strain-gauge-type load cell is employed as the force sensor. Additionally, for example, a strain-gauge-type load cell and/or a MEMS type compact acceleration sensor is employed as the acceleration sensor.

When the gripper 30 in a state of gripping the article A is moved in association with movement of the movable member 20, the control unit of the weighing unit 40 measures the mass of the article A gripped by the gripper 30, on the basis of force and acceleration measured by the sensor unit 42. Specifically, the control unit of the weighing unit 40 divides a force measured by the force sensor by the acceleration measured by the acceleration sensor, and thereby acquires the mass of the article A gripped by the gripper 30.

However, the weighing unit 40 is not limited to a protocol in which the mass of the article A is measured on the basis of the force and acceleration measured when the gripper 30 moves. The weighing unit 40 may use a load cell, etc., to measure the weight of the article A gripped by the gripper 30 in a stationary state.

(2-5) Loading Unit 50 and Loading Unit Driver 54

The article group A1 is loaded in the loading unit 50. Specifically, the loading unit 50 includes an article group accommodation container 52 in which the articles A (article group A1) are accommodated. In the loading unit 50, the article group A1 is loaded onto a loading surface 52a (here, a bottom surface of the article group accommodation container 52).

The gripper 30 grips a portion of the articles A from the article group A1 accommodated in the article group accommodation container 52. In the present embodiment, the article group accommodation container 52 is a rectangular parallelepiped container that is open at the top. The loading unit 50 is configured such that when the amount of articles A accommodated inside the article group accommodation container 52 decreases, a person or machine can exchange an article group accommodation container 52 having a decreased amount of articles A therein with a new article group accommodation container 52 (in which numerous articles A are accommodated).

Furthermore, instead of the loading unit 50 being configured such that the article group accommodation container 52 can be exchanged, the loading unit 50 may have an article supply mechanism for supplying articles A to the article group accommodation container 52.

The loading unit 50 moves between a first position and a second position due to a loading unit driver 54. The loading unit driver 54 moves the loading unit 50 using, for example, a motor and/or fluid pressure as a driving source. The first position is the position at which the gripper 30 grips the articles A of the article group A1 loaded in the loading unit 50. The second position is the position at which the gripper 30 is not gripping the articles A from the article group A1 loaded in the loading unit 50.

The loading unit driver 54 moves the loading unit 50 in a direction intersecting a direction of movement of the movable member 20, between the first position and the second position. In the present embodiment, the loading unit driver 54 moves the loading unit 50 in a horizontal direction between the first position and the second position.

The first position of the loading unit 50 is, specifically, a position directly under the gripper 30. When the loading unit 50 is in the first position, and the movable member 20 is moved by the robot arm 10 such that the gripper 30 approaches a prescribed position with respect to the loading unit 50, the gripper 30 can grip an article A loaded in the loading unit 50. Moreover, the first position of the loading unit 50 is a position directly above the discharge chute 60.

Meanwhile, the second position of the loading unit 50 is a position separated from directly under the gripper 30. In the present embodiment, the movable member 20 to which the grippers 30 are attached moves only in the vertical direction, and therefore when the loading unit 50 is in the second position, the grippers 30 cannot grip articles A loaded in the loading unit 50. Moreover, the second position of the loading unit 50 is a position separated from directly above the discharge chute 60.

(2-6) Discharge Chute 60

The discharge chute 60 is a funnel-shaped member. The discharge chute 60 is disposed directly under the grippers 30. In addition, when the loading unit 50 is positioned at the first position, the discharge chute 60 is disposed directly under the loading unit 50. In other words, the loading unit 50 positioned in the first position is disposed between the grippers 30 and the discharge chute 60.

Meanwhile, when the loading unit 50 is positioned at the second position, the loading unit 50 is not disposed between the grippers 30 and the discharge chute 60.

The grippers 30 release the gripping, whereby the articles A supplied from the grippers 30 are discharged from the discharge chute 60 to outside the weighing device 100. Specifically, when the loading unit 50 is positioned at the second position, articles A that are dropped when gripping by the grippers 30 is released are received in the discharge chute 60, whereupon the articles A are discharged from the discharge chute 60 to outside of the weighing device 100.

(2-7) Control Unit 70

Although not illustrated, the control unit 70 has a CPU and/or memory such as ROM and/or RAM, etc. As shown in FIG. 2, the control unit 70 is electrically connected to the robot arm 10, the gripping member driving mechanisms 34, the weighing units 40, and the loading unit driver 54.

The CPU executes a program stored in memory, and the control unit 70 thereby controls the operation of the various constituents of the weighing device 100 such as the robot arm 10, the gripping member driving mechanisms 34, and the loading unit driver 54, and/or carries out, inter alia, a combination calculation which utilizes the weight values acquired by the weighing units 40 for the articles A.

The various functions of the control unit 70 need not be realized by software, and may be realized by hardware, or may be realized by cooperation between hardware and software.

(2-7-1) Control of Operation of Gripping Member Driving Mechanism 34

The control unit 70 has, as control modes for the gripping member driving mechanism 34, a first control mode, and a second control mode that differs from the first control mode.

In the first control mode, the control unit 70 controls the gripping member driving mechanism 34, and causes the gripping members 32 to execute a first operation.

The first operation is an operation in which the gripping members 32 grip an article A and subsequently release the gripping of the article A. Here, the first operation is a series of operations whereby a plurality of gripping members 32 in mutually separated positions as illustrated in FIG. 5B shift radially inward and move to mutually close positions as illustrated in FIG. 5C, after which the plurality of gripping members 32 return again to the mutually separated positions as illustrated in FIG. 5B.

In the second control mode, the control unit 70 controls the gripping member driving mechanism 34, and causes the gripping members 32 to execute a second operation. The second operation is an operation in which the gripping members 32 remove adhering matter adhering to the gripping members 32.

Adhering matter is, for example, the article A itself, and/or a sticky substance, etc., included in the article A. For example, if the article A is spaghetti, the adhering matter may be noodles or ingredients and/or spaghetti sauce, etc.

By providing the control unit 70 with the second control mode as a control mode of the gripping member driving mechanism 34, effects like that described below are obtained. The weighing unit 40 corresponding to the gripper 30 acquires, as the weight of the article A, not only the weight of the article A gripped by the gripping members 32, but also the weight of the adhering matter adhering to the gripping members 32.

However, the adhering matter is not the article A gripped by the gripping member 32, and therefore even if the gripping members 32 release the gripping of the article A, there is a concern that the adhering matter will not drop from the gripping members 32.

Therefore, when the weight of the adhering matter adhering to the gripping member 32 increases, there is a concern that a deviation could occur between the weight of the article A discharged from the gripper 30, and the weight of the article A weighed by the weighing unit 40 corresponding to the gripper 30 thereof.

Moreover, there is a concern that the adhering matter that has not dropped could drop suddenly into the discharge chute 60, and that weighing precision could be impaired.

Furthermore, a state in which adhering matter remains adhered to the gripping members 32 for a long period of time is not preferable from a sanitary perspective. However, in the present embodiment, the control unit 70 has a second control mode as a control mode for the gripping member driving mechanism 34, and the gripping members 32 carry out the second operation in which adhering matter adhering to the gripping members 32 is removed, and such a problem can thereby be alleviated.

The second operation of the gripping members 32 is an operation that differs from the first operation. The matter of the first operation and the second operation differing includes a case in which the mode of shifting of the gripping members 32 in the first operation and the mode of shifting of the gripping members 32 in the second operation differ.

The matter of the first operation and the second operation differing also includes a case in which the modes of shifting of the gripping members 32 are the same, but either the operating speed or the number of executions of the operation of the gripping members 32 differs between the first operation and the second operation.

A specific example of the second operation of the gripping members 32 is described below. The aspect of the second operation of the gripping members 32 given as one example described below may be combined, as appropriate, with an aspect of the second operation according to another example insofar as said aspects are not mutually contradictory.

(a) First Example of Second Operation of Gripping Members 32

For convenience of description, the positions of the plurality of gripping members 32 depicted in FIG. 5B are referred to as distant positions, and the positions of the plurality of gripping members 32 depicted in FIG. 5C are referred to as close positions.

The second operation of the gripping members 32 according to a first example is a series of operations in which, similar to the first operation, the plurality of gripping members 32 that are mutually separated and disposed at distant positions as in FIG. 5B are shifted radially inward and moved to close positions as illustrated in FIG. 5C, after which the gripping members 32 are returned again to the distant positions.

However, during the second operation, the average operating speed (hereinafter, referred to as an approaching speed) at which the gripping members 32 move from the distant positions to the close positions is greater than the approaching speed during the first operation. Additionally, or alternatively, the average operating speed (hereinafter, referred to as a separating speed) at which the gripping members 32 move from the close positions to the distant positions during the second operation is greater than the separating speed during the first operation.

In other words, during the second operation, movement of the gripping members 32 from the distant positions to the close positions, and/or movement of the gripping members 32 from the close positions to the distant positions, is performed in less time than in the first operation.

In particular, in the present embodiment, the approaching speed and the separating speed during the second operation are greater than the approaching speed and the separating speed, respectively, during the first operation. For example, the approaching speed and the separating speed of the gripping members 32 during the second operation are two or more times higher (more preferably, five or more times higher) than the approaching speed and the separating speed during the first operation.

Moreover, a maximum acceleration (hereinafter, referred to as an approaching acceleration) of the gripping members 32 when the gripping members 32 are moved from the distant positions to the close positions during the second operation is greater than the approaching acceleration during the first operation.

Additionally, or alternatively, a maximum deceleration (absolute value of the negative acceleration when decelerating, referred to hereinafter as an approaching deceleration) of the gripping members 32 when the gripping members 32 are moved from the distant positions to the close positions during the second operation is greater than the approaching deceleration during the first operation.

Additionally, or alternatively, the maximum acceleration (hereinafter, referred to as a separating acceleration) of the gripping members 32 when the gripping members 32 are moved from the close positions to the distant positions during the second operation is greater than the separating acceleration during the first operation. Additionally, or alternatively, a maximum deceleration (absolute value of the negative acceleration when decelerating, referred to hereinafter as an approaching deceleration) of the gripping members 32 when the gripping members 32 are moved from the close positions to the distant positions during the second operation is greater than the separating deceleration during the first operation.

For example, the approaching acceleration and the separating acceleration of the gripping members 32 during the second operation are two or more times greater (more preferably, five or more times greater) than the approaching acceleration and the separating acceleration during the first operation. Moreover, the approaching deceleration and the separating deceleration of the gripping members 32 during the second operation are two or more times greater (more preferably, five or more times greater) than the approaching deceleration and the separating deceleration during the first operation.

(b) Second Example of Second Operation of Gripping Members 32

The second operation of the gripping members 32 of the first example is a series of operations in which, similar to the first operation, the plurality of gripping members 32 that are mutually separated and disposed at distant positions as in FIG. 5B are shifted radially inward and moved to close positions as illustrated in FIG. 5C, after which the gripping members 32 are returned again to the distant positions.

However, during the second operation, the number of times that the gripping members 32 are operated to move from the distant positions to the close positions or from the close positions to the distant positions is greater than during the first operation. For example, during the first operation, the series of operations in which the gripping members 32 are moved from the distant positions to the close positions and then again returned to the distant positions is executed one time, whereas during the second operation, the series of operations in which the gripping members are moved from the distant positions to the close positions and then again returned to the distant positions is executed a plurality of times. For example, during the second operation, the gripping members 32 execute the series of operations two or more times (more preferably, four or more times).

(c) Third Example of Second Operation of Gripping Members 32

During the second operation, the gripping members 32 need not move in a range between the distant positions and the close positions as in the first operation. For example, the gripping members 32 may move within a narrower range during the second operation than during the first operation. For example, the movement amount of the gripping members 32 during the second operation may be set to ¾ or less (more preferably, ½ or less) of the movement amount of the gripping members 32 during the first operation. Although not limited, the movement amount of the gripping members 32 during the second operation is set, for example, to ⅛ or more of the movement amount of the gripping members 32 during the first operation.

For example, in the second control mode, the control unit 70 combines the aspects of the first to third examples described above, and controls the gripping member driving mechanism 34 such that the gripping members 32 move back and forth in a narrow interval a plurality of times at a high speed. Through such control by the control unit 70, the gripping members 32 oscillate at a high speed. Furthermore, by causing the gripping members 32 to undergo such an operation, removal of adhered matter adhered to the gripping members 32 is more easily facilitated.

The aspects of the first to third examples of the second operation described above need not all be simultaneously combined, and need only be combined as appropriate. For example, in another embodiment, the control unit 70 may control the gripping member driving mechanism 34 in the second control mode such that the gripping members 32 perform the same motion as that of the first operation (motion of moving from the distant positions to the close positions, and then again returning to the distant positions) only once at a high speed.

(3) Operations of Weighing Device 100

Operation of the weighing device 100 controlled by the control unit 70 will be described with reference to FIGS. 6A to 6I and FIG. 7A. Although the weighing device 100 provided with a plurality of grippers 30 is described here as an example, the present invention can also be applied to a weighing device provided with a single gripper 30.

FIGS. 6A to 6I are schematic side views of the weighing device 100, for explaining the operation of the weighing device 100 of FIG. 1.

In FIGS. 6A to 6I, depiction of the robot arm 10 that moves the movable member 20 is omitted. FIG. 7A is a flowchart for explaining the operation of the weighing device 100 according to a first embodiment.

Figure 6A:
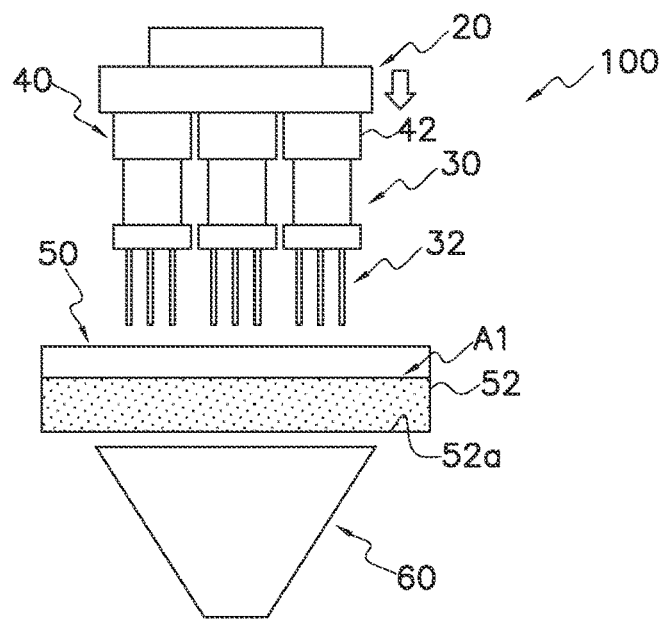
FIG. 6A is a schematic side view of a main portion of the weighing device of FIG. 1, for explaining operations of the weighing device, and depicts a state (initial state) before the grippers grip articles.

FIG. 6A depicts an initial state before the grippers 30 grip the articles A. In FIG. 6A, the movable member 20 is disposed at a prescribed position such that the gripping members 32 of the grippers 30 are disposed outside of the article group accommodation container 52 of the loading unit 50. The loading unit 50 is disposed at a first position directly under the grippers 30. The gripping members 32 of each gripper 30 are disposed at the distant positions as in FIG. 5B.

(Step S1)

When the weighing device 100 is running, the control unit 70 controls the robot arm 10 to move the movable member 20 vertically downward and bring the plurality of grippers 30 close to the loading unit 50 from the initial state.

Figure 6B:
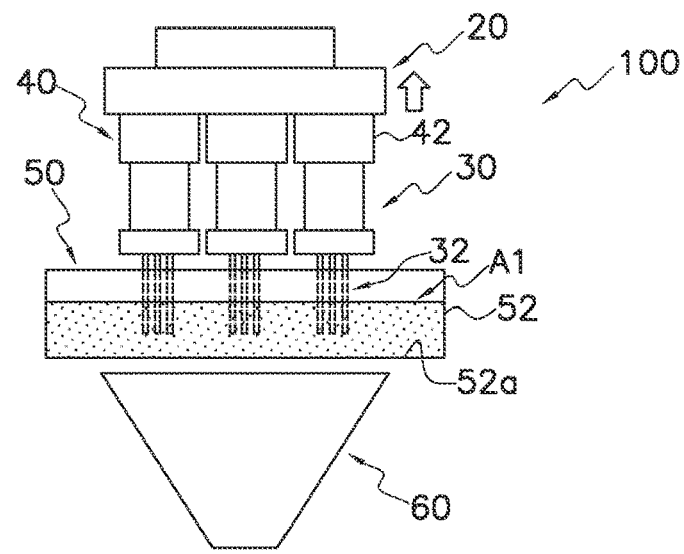
FIG. 6B is a schematic side view of the main portion of the weighing device of FIG. 1, for explaining the operations of the weighing device, and depicts a state in which the gripping members of the grippers are inserted into an article group in order to grip the articles.

Specifically, the control unit 70 controls the operation of the robot arm 10 to move the movable member 20 vertically downward so that the gripping members 32 of the grippers 30 are disposed at a prescribed position enabling the articles A inside the article group accommodation container 52 to be gripped (see FIG. 6B).

More specifically, the control unit 70 controls the operation of the robot arm 10 to move the movable member 20 vertically downward so that the gripping members 32 are at least partially inserted into the article group A1.

(Step S2)

Next, in step S2, the control unit 70 controls the gripping member driving mechanism 34 of each gripper 30, and causes the gripping members 32 to grip the articles A. Preferably, the control unit 70 causes a plurality of grippers 30 to simultaneously grip articles A. However, the present invention is not limited to this configuration, and the control unit 70 may cause the plurality of grippers 30 to grip articles A at different timings.

(Step S3)

Figure 6C:
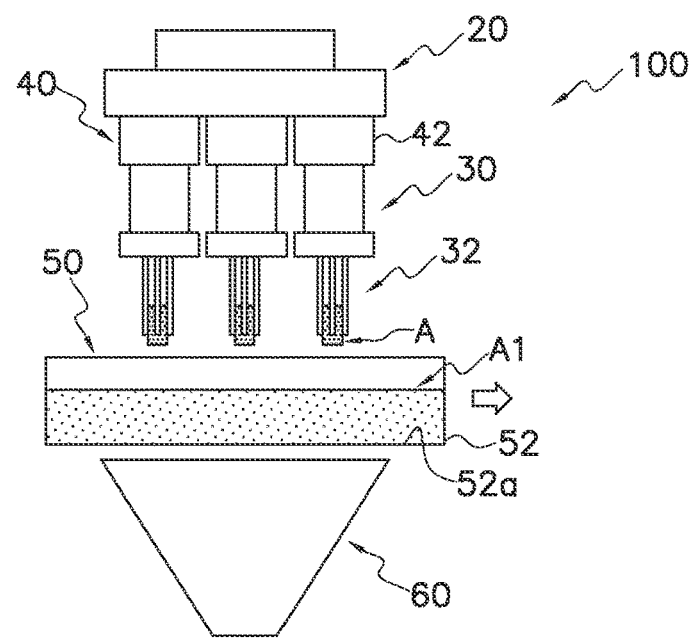
FIG. 6C is a schematic side view of the main portion of the weighing device of FIG. 1, for explaining the operations of the weighing device, and depicts a state in which the gripping members of the grippers that have gripped articles have been moved to outside of an article group accommodation container.

Next, with the plurality of grippers 30 gripping articles A, the control unit 70 controls the robot arm 10 to move the movable member 20 vertically upward such that the gripping members 32 of the grippers 30 are disposed outside of the article group accommodation container 52 of the loading unit 50 (see FIG. 6C). When the robot arm 10 moves the movable member 20 vertically upward, each weighing unit 40 measures the weight of the articles A gripped by the corresponding gripper 30.

(Step S4)

Next, the control unit 70 determines whether a prescribed condition for returning articles A gripped by the grippers 30 to the article group accommodation container 52 without discharging said articles A to the discharge chute 60 is fulfilled by at least one of the operation state of the grippers 30 and the weighing results from the weighing units 40.

Here, the prescribed condition is described. A main purpose of this determination is to return to the article group accommodation container 52 before the article group accommodation container 52 is moved when the weight value of the articles A weighed by the weighing units 40 is not a preset target weight value, or is estimated not to be said target weight value, thereby preventing articles from erroneously being discharged to the chute 60.

Thus, "fulfilling a prescribed condition" involves fulfilling at least one of the following:
(1) the weight value of the articles A weighed by the weighing units 40 is not a preset target weight value;
(2) the operating distance in an operation in which the articles are held by the gripping members 32 is greater than a prescribed range; or
(3) the operating distance in the operation in which the articles A are held by the gripping members 32 is less than the prescribed range.

In particular, in the case of condition (2), the operating distance in an operation in which the articles A are held by the gripping members 32 being greater than a prescribed range signifies that the weight value of said articles A is greater than the target weight value.

Figure 5D:
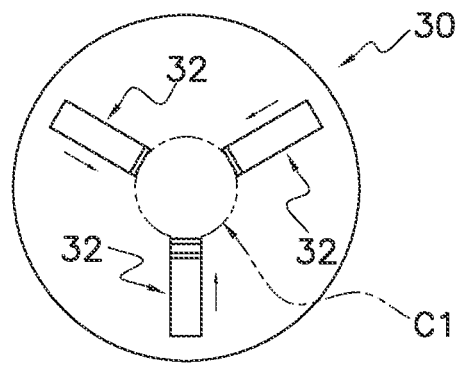
FIG. 5D is a plan view of three gripping members sandwiching a virtual article that matches a lower-limit value of a target weight value as viewed from a distal-end side of the gripping members.

FIG. 5D is a plan view of three gripping members 32 sandwiching a virtual article that matches a lower-limit value of the target weight value as viewed from a distal-end side of the gripping members 32. In FIG. 5D, a circle C1 is a smallest inscribed circle with respect to the three gripping members 32.

Figure 5E:
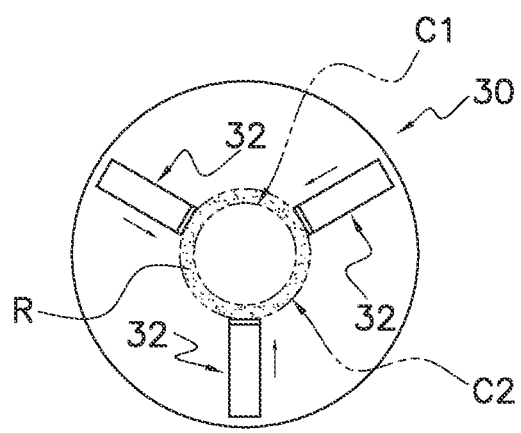
FIG. 5E is a plan view of three gripping members sandwiching a virtual article that matches an upper-limit value of the target weight value as viewed from the distal-end side of the gripping members.

FIG. 5E is a plan view of three gripping members 32 sandwiching a virtual article that matches an upper-limit value of the target weight value as viewed from the distal-end side of the gripping members 32. In FIG. 5E, a circle C2 is a smallest inscribed circle with respect to the three gripping members 32. A range bounded by the circles C1 and C2 is a prescribed range R in which the target weight value is satisfied.

Figure 5F:
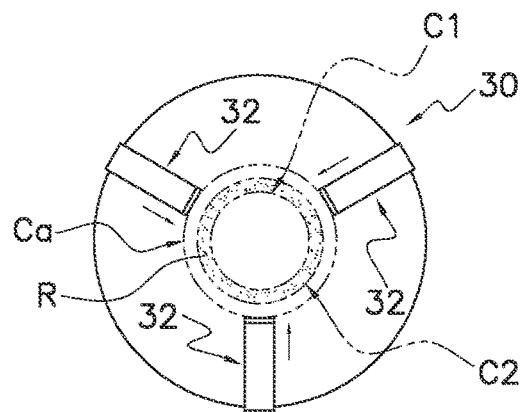
FIG. 5F is a plan view of three gripping members sandwiching a virtual article that exceeds the upper-limit value of the target weight value as viewed from the distal-end side of the gripping members.

FIG. 5F is a plan view of three gripping members 32 sandwiching a virtual article that exceeds the upper-limit value of the target weight value as viewed from the distal-end side of the gripping members 32. In FIG. 5F, a circle Ca is positioned further outward than the prescribed range R as viewed from a circle center. Specifically, this signifies that a position (coordinates) reached by the gripping members 32 is further outward than a position (coordinates) reached by gripping members sandwiching a virtual article that matches the upper-limit value of the target weight value.

In such instances, it is assessed that "the operating distance in an operation in which the articles are held by the gripping members 32 to hold the articles is greater than a prescribed range."

Moreover, in the case of condition (3), the operating distance in the operation in which the articles A are held by the gripping members 32 being less than the prescribed range signifies that the weight value of said articles is less than the target weight value.

Figure 5G:
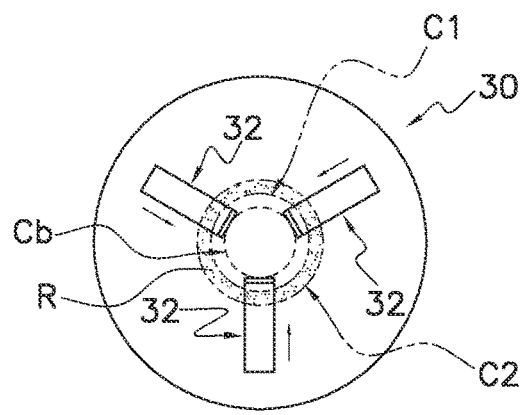
FIG. 5G is a plan view of three gripping members sandwiching a virtual article that is below the lower-limit value of the target weight value as viewed from the distal-end side of the gripping members.

FIG. 5G is a plan view of three gripping members 32 sandwiching a virtual article that is below the lower-limit value of the target weight value as viewed from the distal-end side of the gripping members 32. In FIG. 5G, a circle Cb is positioned further inward than the prescribed range R as viewed from the circle center. Specifically, this signifies that a position (coordinates) reached by the gripping members 32 is further inward than a position (coordinates) reached by gripping members 32 sandwiching a virtual article that matches the lower-limit value of the target weight value.

In such instances, it is assessed that "the operating distance in an operation in which the articles A are held by the gripping members 32 is less than a prescribed range."

Figure 7B:
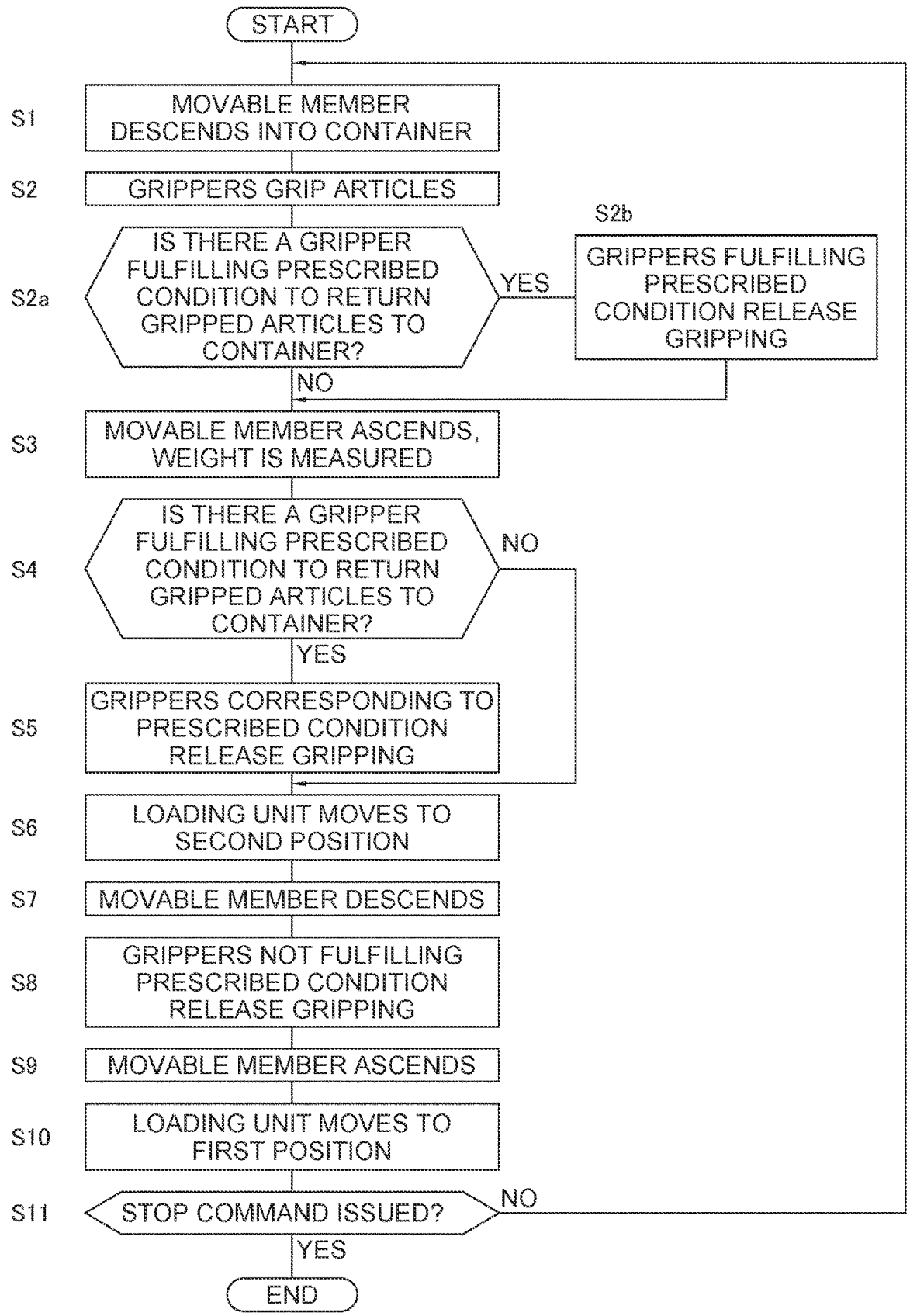
FIG. 7B is a flowchart for explaining the operation of a weighing device according to a modification of the first embodiment.

The assessment as to whether either of prescribed conditions (2) and (3) is fulfilled can be performed when step S2 is completed, and therefore, as illustrated in FIG. 7B, a step to assess whether either of prescribed conditions (2) and (3) is fulfilled may be provided between step S2 and step S3. A more detailed description is provided in section "(5) Modification of First Embodiment" below.

The control unit 70 proceeds to step S5 when it is determined that at least one of the operation state of the grippers 30 and the weighing results from the weighing units 40 fulfills the prescribed condition, but proceeds to step S6 when it is determined that neither fulfills the prescribed condition.

(Step S5)

Figure 6D:
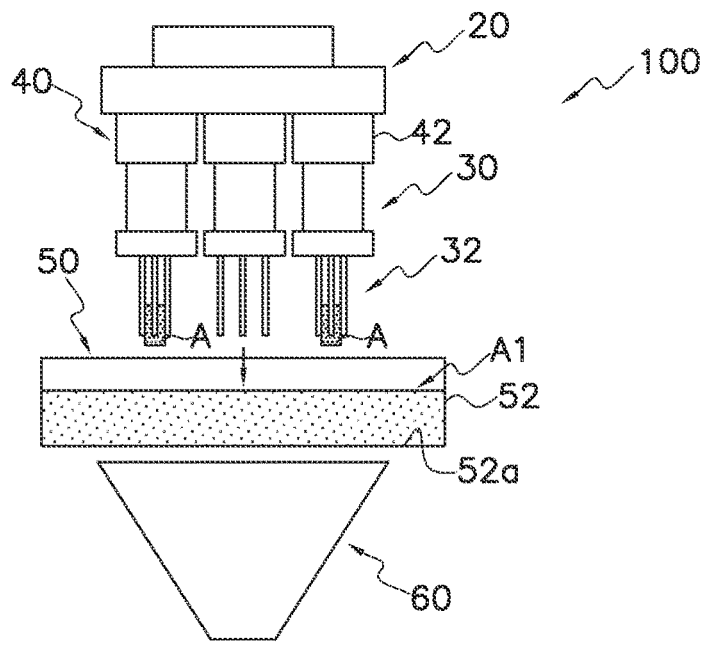
FIG. 6D is a schematic side view of the main portion of the weighing device of FIG. 1, for explaining operations of the weighing device, and depicts a state in which a gripper corresponding to a weight value not selected for a combination has dropped articles into the article group accommodation container.

Next, the control unit 70 controls the gripping member drive mechanism 34 of grippers 30 that fulfill at least one of the prescribed conditions (1), (2), and (3) and causes said grippers 30 to release the gripping of the articles A (see FIG. 6D).

In other words, if there is a gripper 30 gripping an article A for which the weight value is not the target weight value, the control unit 70 controls the gripping member drive mechanism 34 of said gripper 30 and causes the gripper 30 to release the gripping of the article A.

The article A gripped by the gripper 30 is then dropped into the article group accommodation container 52 of the loading unit 50 positioned at the first position, and is reused as an article A of the article group A1. At this time, the first operation is completed for the gripping members 32 of grippers 30 that fulfilled the prescribed condition.

Moreover, immediately after gripping of the articles A has been released according to the first operation by the gripping members 32 of the grippers 30, the control unit 70 controls the gripping member drive mechanisms 34 of said grippers 30, and causes the gripping members 32 to execute the second operation. When the articles A are articles that do not readily adhere to the gripping members 32, the second operation does not necessarily need to be executed.

The articles A in the gripper 30 that fulfills at least one of conditions (1), (2), and (3) being returned to the article group accommodation container 52 avoids a situation where the grippers 30 operate while still holding "articles A for which the weight value is not the target weight value." As a result, dropping of articles from the grippers 30 and reductions in weighing precision are suppressed. Furthermore, wasteful operation is eliminated, and production efficiency can be improved.

(Step S6)

Figure 6E:
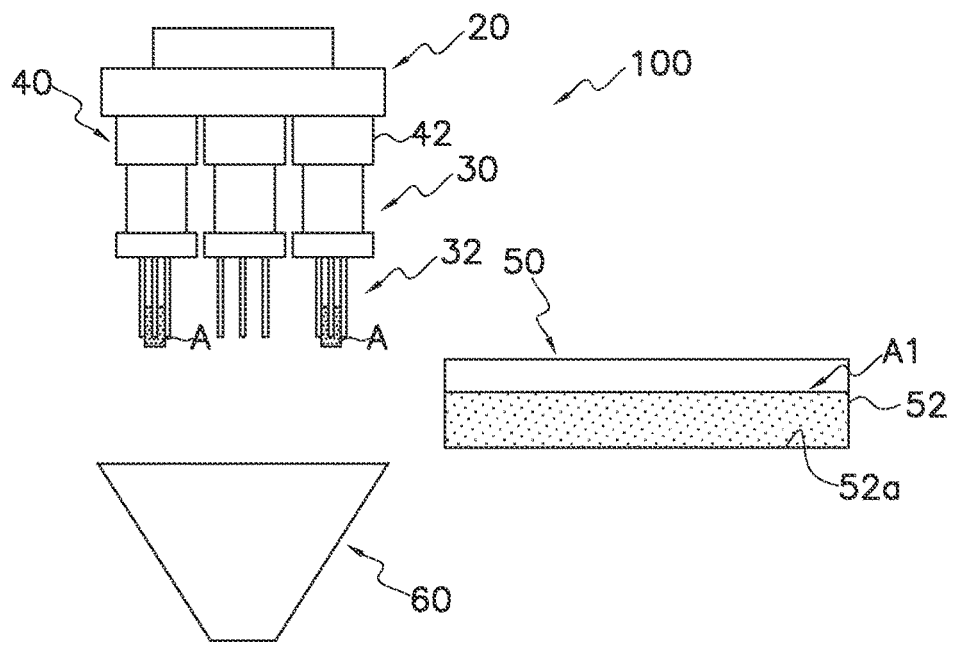
FIG. 6E is a schematic side view of the main portion of the weighing device of FIG. 1, for explaining operations of the weighing device, and depicts a state in which a loading unit has moved to a second position.

Next, the control unit 70 controls the loading unit driver 54 to move the loading unit 50 from the first position to the second position (see FIG. 6E). Movement of the loading unit 50 to the second position brings about a state in which the loading unit 50 is not disposed between the grippers 30 and the discharge chute 60.

(Step S7)

Figure 6F:
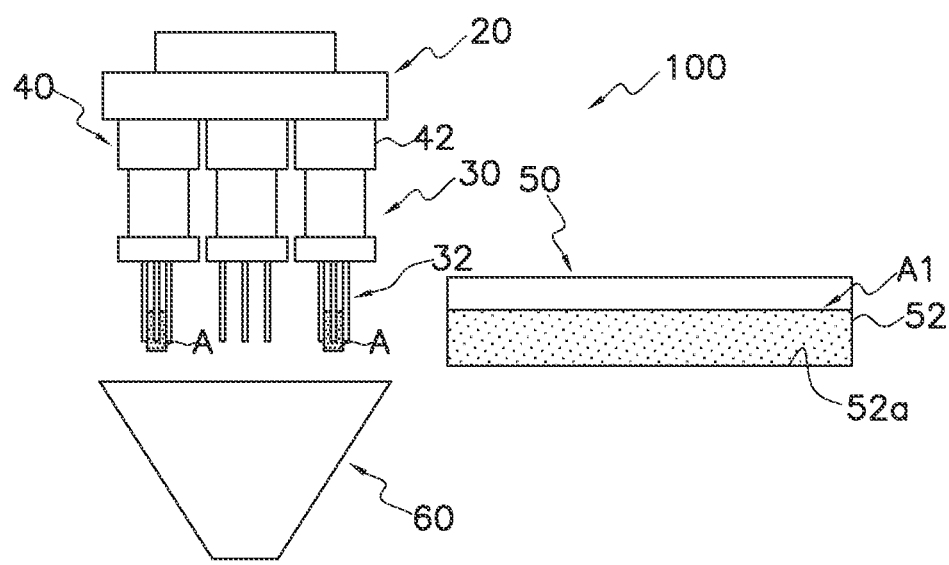
FIG. 6F is a schematic side view of the main portion of the weighing device of FIG. 1, for explaining operations of the weighing device, and depicts a state in which the grippers have moved to a vicinity of a chute in order to discharge the articles.

Next, the control unit 70 controls the robot arm 10 to move the movable member 20 vertically downward and bring the plurality of grippers 30 close to the discharge chute 60 (see FIG. 6F).

Depending on the articles, it may be unnecessary to execute the "operation for bringing close." In such cases, the articles may be dropped without moving the movable member 20 vertically downward.

(Step S8)

Figure 6G:
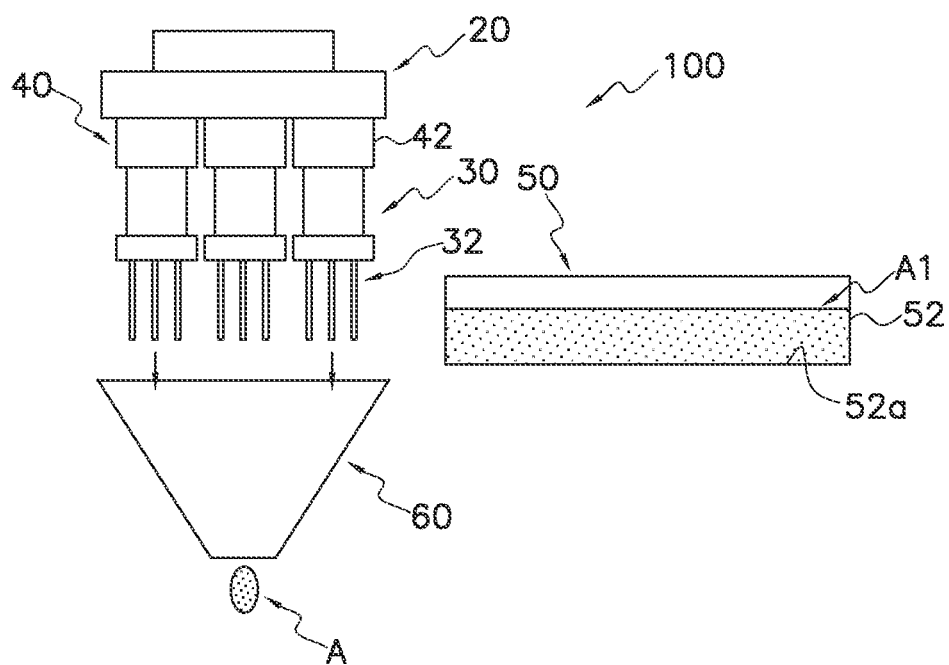
FIG. 6G is a schematic side view of the main portion of the weighing device of FIG. 1, for explaining operations of the weighing device, and depicts a state in which some of the grippers have dropped articles into the chute.

Next, the control unit 70 causes the grippers 30 that did not fulfill any of the prescribed conditions (1), (2), and (3) in step 5 to release the gripping of the articles A, and discharges the articles A from the discharge chute 60 (see FIG. 6G). The first operation is completed at this time for the gripping members 32 of these grippers 30.

Moreover, immediately after gripping of the articles A has been released according to the first operation by the gripping members 32 of the grippers 30, the control unit 70 controls the gripping member drive mechanisms 34 of said grippers 30, and causes the gripping members 32 to execute the second operation. When the articles A are articles that do not readily adhere to the gripping members 32, the second operation does not necessarily need to be executed.

(Step S9)

Figure 6H:
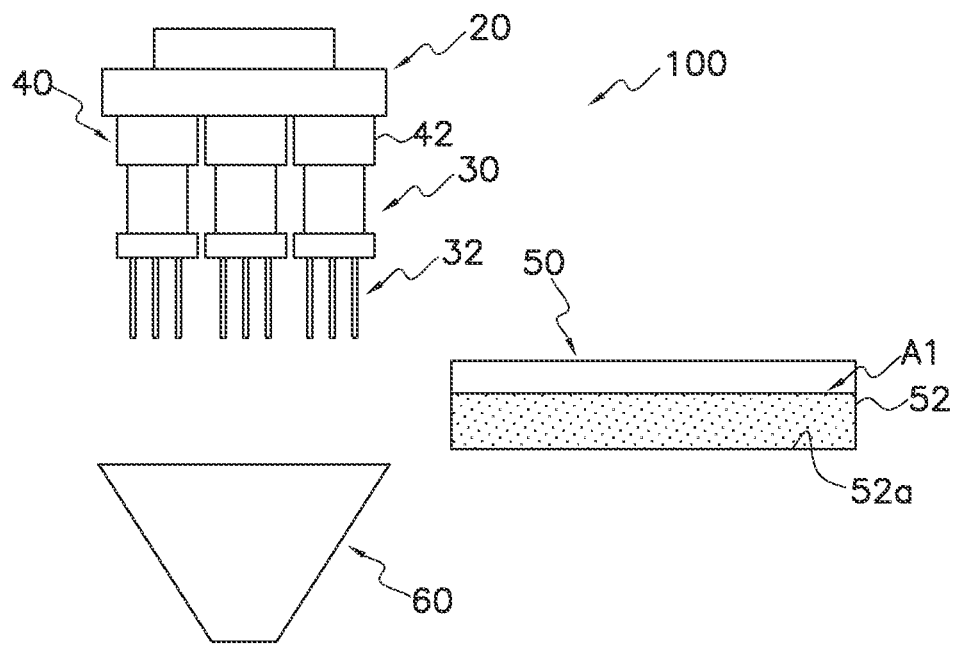
FIG. 6H is a schematic side view of the main portion of the weighing device of FIG. 1, for explaining operations of the weighing device, and depicts a state in which the grippers have moved directly upward.

When discharging of the articles A is completed, the control unit 70 controls the robot arm 10 to return the movable member 20 to an original position (see FIG. 6H).

(Step S10)

Figure 6I:
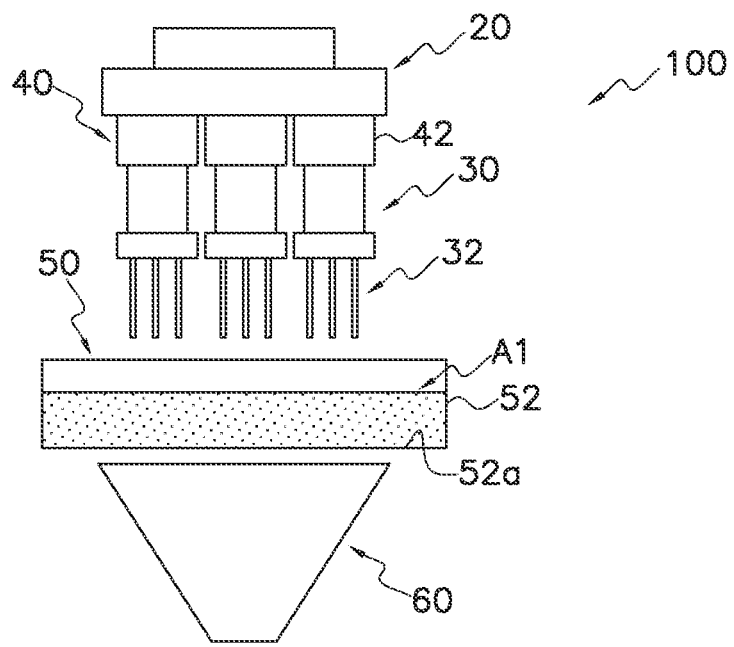
FIG. 6I is a schematic side view of the main portion of the weighing device of FIG. 1, for explaining operations of the weighing device, and depicts a state in which the loading unit has moved to a first position.

Next, the control unit 70 also controls the loading unit driver 54 to return the loading unit 50 from the second position to the first position directly under the grippers 30 (see FIG. 6I).

(Step S11)

The control unit 70 then determines whether there is a stop command. The control unit 70 stops the control when it is determined that there is a stop command, but returns to step S1 when it is determined that there is no stop command.

The operation of the weighing device 100 described here is merely one example, and can be changed, as appropriate, insofar as such change is not contradictory.

Moreover, for example, when the control unit 70 controls the robot arm 10 in a state in which the plurality of grippers 30 are gripping the articles A to cause the movable member 20 to move upward from the position depicted in FIG. 6B to the position depicted in FIG. 6C, the control unit 70 may control the robot arm 10 such that the movable member 20 is moved downward one or more times.

Moreover, moving the movable member 20 up and down as described above makes it possible for articles adhering to the gripping members 32 to be shaken off when the grippers 30 release gripping as well. Articles adhering to the gripping members 32 are articles that are not gripped by the gripping members 32 and that are likely to drop regardless of operation of the gripping members 32. Moving the movable member 20 downward to shake off, in advance, articles adhering to the gripping members 32 brings the weight of the articles A weighed by the weighing unit 40 closer to the weight of the articles A gripped by the gripping members 32, and makes it possible to improve the weighing precision.

(4) Characteristics of First Embodiment (4-1)

In the weighing device 100, when at least one of the operation state of the grippers 30 and the weighing results from the weighing units 40 fulfills any condition from among (1) the weight value of the articles A weighed by the weighing units 40 not being a preset target weight value, (2) the operating distance in an operation in which the articles A are held by the gripping members 32 being greater than a prescribed range, and (3) the operating distance in the operation in which the articles A are held by the gripping members 32 being less than the prescribed range, the articles A gripped by the grippers 30 are returned to the article group accommodation container 52 by the control unit 70 without said articles A being discharged to the discharge chute 60.

The operating distance in the operation in which the articles A are held by the grippers 30 being greater than the prescribed range signifies that the weight value for said articles is greater than the target weight value.

For example, when articles A are sandwiched and held between three gripping members 32, a range bounded by a smallest inscribed circle with respect to the three gripping members 32 when an article that matches a lower-limit value of the target weight value is sandwiched, and by a smallest inscribed circle with respect to the three gripping members 32 when an article that matches an upper-limit value of the target weight value is sandwiched, is a prescribed range R in which the target weight value is satisfied.

Therefore, the smallest inscribed circle with respect to the three gripping members 32 when an article A that exceeds the upper-limit value of the target weight value is sandwiched is positioned further outward than the prescribed range R as viewed from the circle center. Specifically, this signifies that a position (coordinates) reached by the gripping members 32 is further outward than a position (coordinates) reached by gripping members 32 sandwiching an article A that matches the upper-limit value of the target weight value.

In such instances, it is assessed that "the operating distance in an operation in which the articles A are held by the gripping members 32 is greater than the prescribed range R." Thus, a situation where the grippers 30 operate while still holding "articles A for which the weight value is not the target weight value" is avoided.

Moreover, the operating distance in the operation in which the articles A are held by the grippers 30 being less than the prescribed range signifies that the weight value for said articles is less than the target weight value.

For example, the smallest inscribed circle with respect to the three gripping members 32 when an article A that is below the lower-limit value of the target weight value is sandwiched is positioned further inward than the prescribed range R as viewed from the circle center. Specifically, this signifies that a position (coordinates) reached by the gripping members 32 is further inward than a position (coordinates) reached by gripping members 32 sandwiching an article A that matches the lower-limit value of the target weight value.

In such instances, it is assessed that "the operating distance in an operation in which the articles A are held by the gripping members 32 is less than the prescribed range R."

Thus, a situation where the grippers 30 operate while still holding "articles A for which the weight value is not the target weight value" is avoided. As a result, dropping of articles A from the grippers 30 and reductions in weighing precision are suppressed. Furthermore, wasteful operation is eliminated, and production efficiency can be improved.

(4-2)

In the weighing device 100, the operating distance in an operation in which the articles A are held by the grippers 30 is the degree to which the gripping members 32 open. The opening degree of the gripping members 32 being greater than a prescribed range signifies that the weight value of the articles A is greater than the target weight value. Moreover, the opening degree of the gripping members 32 being less than the prescribed range signifies that the weight value of the articles A is less than the target weight value.

(5) Modification of First Embodiment

FIG. 7B is a flowchart for explaining the operation of the weighing device 100 according to a modification of the first embodiment. In FIG. 7B, the difference between the modification and FIG. 7A is that a step S2a and a step S2b are inserted between step S2 and step S3.

Steps S1, S2, and S3 to S1l in FIG. 7B are the same as those in FIG. 7A, and these steps are therefore not described here. The newly inserted step S2a and step S2b are described here.

(Step S2a)

In step S2a, the control unit 70 determines whether a prescribed condition for returning articles A gripped by the grippers 30 to the article group accommodation container 52 without discharging said articles A to the discharge chute 60 is fulfilled by the operation state of the grippers 30.

Here, "a prescribed condition being fulfilled" involves fulfilling at least one of the following, i.e., excluding (1) from among prescribed conditions (1) to (3) described in step S4 of the first embodiment:

(2) the operating distance in an operation in which the articles A are held by the gripping members 32 is greater than a prescribed range; or (3) the operating distance in the operation in which the articles A are held by the gripping members 32 is less than the prescribed range.

Because it is possible in step S2 to determine whether the operating distance in the operation in which the articles A are held by the gripping members 32 is greater than or less than the prescribed range, it is not necessary for the control unit 70 to move the movable member 20 vertically upward as in the first embodiment.

The control unit 70 proceeds to step S2b when it is determined that the operation state of the grippers 30 fulfills the prescribed condition (2) or (3), but proceeds to step S3 when it is determined that the operation state does not fulfill either prescribed condition.

(Step S2b)

Next, the control unit 70 controls the gripping member drive mechanism 34 of grippers 30 that fulfill at least one of the prescribed conditions (2) and (3), and causes said grippers 30 to release the gripping of the articles A (see FIG. 6D).

In other words, if there is a gripper 30 gripping an article A for which the weight value is not the target weight value, the control unit 70 controls the gripping member drive mechanism 34 of said gripper 30 and causes the gripper 30 to release the gripping of the article A.

The article A gripped by the gripper 30 is then dropped into the article group accommodation container 52 of the loading unit 50 positioned at the first position, and is reused as an article A of the article group A1. At this time, the first operation is completed for the gripping members 32 of grippers 30 that fulfilled the prescribed condition.

Moreover, immediately after gripping of the articles A has been released according to the first operation by the gripping members 32 of the grippers 30, the control unit 70 controls the gripping member drive mechanisms 34 of said grippers 30, and causes the gripping members 32 to execute the second operation. When the articles A are articles that do not readily adhere to the gripping members 32, the second operation does not necessarily need to be executed.

The articles A in the gripper 30 that fulfills at least one of conditions (2) and (3) being returned to the article group accommodation container 52 avoids a situation where the grippers 30 operate while still holding "articles A for which the weight value is not the target weight value." As a result, dropping of articles from the grippers 30 and reductions in weighing precision are suppressed. Furthermore, wasteful operation is eliminated, and production efficiency can be improved.

Second Embodiment

In the first embodiment, a description was given presupposing a weighing device that grips fixed quantities. In a second embodiment, a combinatorial weighing device that carries out combinatorial weighing is described.

The structure of the weighing device according to the first embodiment is used without modification as the structure of the weighing device according to the second embodiment, and only controls thereof are varied. Therefore, the components are not described in detail here.

(1) Operations of Weighing Device 100

Operations of the weighing device 100 controlled by the control unit 70 are described while referring to FIGS. 6A to 6I and FIG. 8A.

Figure 8A:
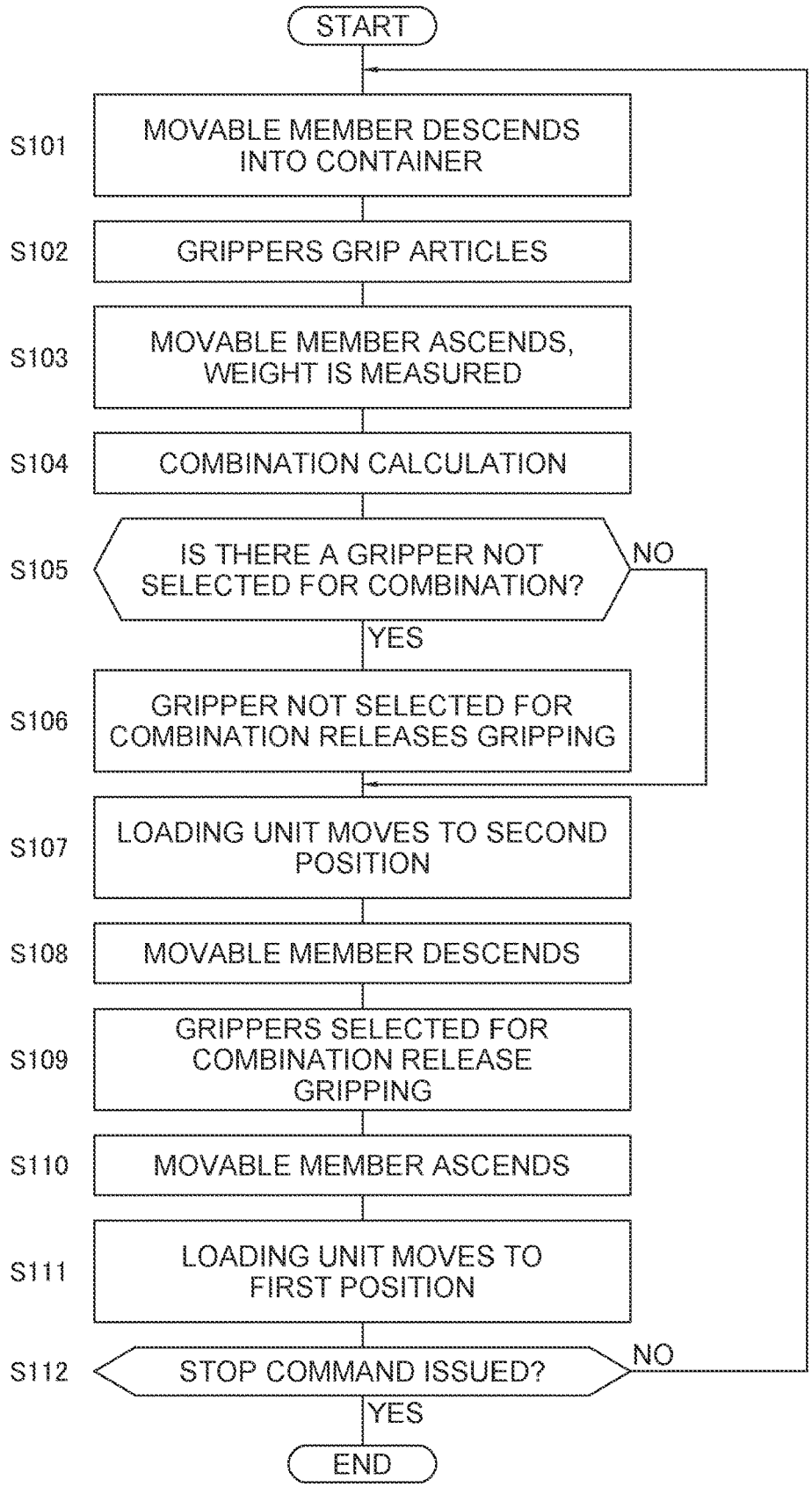
FIG. 8A is a flowchart for explaining the operation of a weighing device according to a second embodiment.

FIG. 8A is a flowchart for explaining the operation of the weighing device 100 according to the second embodiment.

In FIG. 6A, the movable member 20 is disposed at a prescribed position such that the gripping members 32 of the grippers 30 are disposed outside of the article group accommodation container 52 of the loading unit 50. The loading unit 50 is disposed at a first position directly under the grippers 30. The gripping members 32 of each gripper 30 are disposed at the distant positions as in FIG. 5B.

(Step S101)

When the weighing device 100 is running, the control unit 70 controls the robot arm 10 to move the movable member 20 vertically downward and bring the plurality of grippers 30 closer to the loading unit 50.

Specifically, the control unit 70 controls the operation of the robot arm 10 to move the movable member 20 vertically downward so that the gripping members 32 of the grippers 30 are disposed at a prescribed position enabling the articles A inside the article group accommodation container 52 to be gripped (see FIG. 6B).

More specifically, the control unit 70 controls the operation of the robot arm 10 to move the movable member 20 vertically downward so that the gripping members 32 are at least partially inserted into the article group A1.

(Step S102)

Next, the control unit 70 controls the gripping member drive mechanism 34 of each gripper 30 to cause the gripping members 32 to grip articles A. Preferably, the control unit 70 causes the plurality of grippers 30 to grip articles A simultaneously. However, the present invention is not limited to this configuration, and the control unit 70 may cause the plurality of grippers 30 to grip articles A at different timings.

The assessment as to whether either of prescribed conditions (2) and (3) is fulfilled in the first embodiment can be performed when step S102 is completed, and therefore a step to assess whether either of prescribed conditions (2) and (3) is fulfilled may be provided between step S102 and step S103. A more detailed description is provided in section "(3) Modification of Second Embodiment" below.

(Step S103)

Next, with the plurality of grippers 30 gripping articles A, the control unit 70 controls the robot arm 10 to move the movable member 20 vertically upward such that the gripping members 32 of the grippers 30 are disposed outside of the article group accommodation container 52 of the loading unit 50 (see FIG. 6C). When the robot arm 10 moves the movable member 20 vertically upward, each weighing unit 40 measures the weight of the articles A gripped by the corresponding gripper 30.

(Step S104)

Next, the control unit 70 carries out a combination calculation using the weight values of the articles A gripped by the grippers 30, each weight value being measured by the respective weighing unit 40, and finds a combination of weight values for which a total value thereof reaches a target weight range.

(Step S105)

Next, the control unit 70 determines whether there is a gripper 30 not selected for the combination among the grippers 30.

The control unit 70 proceeds to step S106 when it is determined that there is a gripper 30 not selected for the combination, but proceeds to step S107 when it is determined that there is no gripper 30 not selected for the combination.

(Step S106)

Next, if there is a gripper 30 for which the weight of the article A gripped thereby was not selected for the combination, the control unit 70 controls the gripping member drive mechanism 34 of said gripper 30 and causes the gripper 30 to release the gripping of the article A according to the first operation (see FIG. 6D).

The article A gripped by the gripper 30 is then dropped into the article group accommodation container 52 of the loading unit 50 positioned at the first position, and is reused as an article A of the article group A1. At this time, the first operation is completed for the gripping members 32 of grippers 30 not selected for the combination.

Next, immediately after gripping of the articles A has been released according to the first operation by the gripping members 32 of the grippers 30 caused to release the gripping of the articles A, the control unit 70 controls the gripping member driving mechanisms 34 of said grippers 30, and causes the gripping members 32 to execute a second operation. When the articles A are articles that do not readily adhere to the gripping members 32, the second operation does not necessarily need to be executed.

(Step S107)

Next, the control unit 70 controls the loading unit driver 54 to move the loading unit 50 from the first position to the second position (see FIG. 6E). Movement of the loading unit 50 to the second position brings about a state in which the loading unit 50 is not disposed between the grippers 30 and the discharge chute 60.

(Step S108)

Next, the control unit 70 controls the robot arm 10 to move the movable member 20 vertically downward and bring the plurality of grippers 30 close to the discharge chute 60 (see FIG. 6F).

(Step S109)

Next, on the basis of the result of the combination calculation, the control unit 70 causes the grippers 30 corresponding to the combination of weight values for which the target weight range is reached to release gripping of the articles A while above the discharge chute 60, and discharges the articles A from the discharge chute A (see FIG. 6G). The first operation is completed at this time for the gripping members 32 of the grippers 30 selected for the combination.

Next, immediately after gripping of the articles A has been released according to the first operation by the gripping members 32 of the grippers 30 caused to release the gripping of the articles A, the control unit 70 controls the gripping member driving mechanisms 34 of said grippers 30, and causes the gripping members 32 to execute a second operation. When the articles A are articles that do not readily adhere to the gripping members 32, the second operation does not necessarily need to be executed.

(Step S110)

When discharging of articles A is completed for all combinations of weight values for which the target weight range is reached, the control unit 70 controls the robot arm 10 to return the movable member 20 to an original position (see FIG. 6H).

(Step S111)

Next, the control unit 70 also controls the loading unit driver 54 to return the loading unit 50 from the second position to the first position directly under the grippers 30 (see FIG. 6I).

(Step S112)

The control unit 70 then determines whether there is a stop command. The control unit 70 stops the control when it is determined that there is a stop command, but returns to step S1 when it is determined that there is no stop command.

The operation of the weighing device 100 described here is merely one example, and can be changed, as appropriate, insofar as such change is not contradictory.

Moreover, for example, when the control unit 70 controls the robot arm 10 in a state in which the plurality of grippers 30 are gripping the articles A to cause the movable member 20 to move upward from the position depicted in FIG. 6B to the position depicted in FIG. 6C, the control unit 70 may control the robot arm 10 such that the movable member 20 is moved downward one or more times.

Moreover, moving the movable member 20 up and down as described above makes it possible for articles adhering to the gripping members 32 to be shaken off when the grippers 30 release gripping as well. Articles adhering to the gripping members 32 are articles that are not gripped by the gripping members 32 and that are likely to drop regardless of operation of the gripping members 32. Moving the movable member 20 downward to shake off, in advance, articles adhering to the gripping members 32 brings the weight of the articles A weighed by the weighing unit 40 closer to the weight of the articles A gripped by the gripping members 32, and makes it possible to improve the weighing precision.

(2) Characteristics of Second Embodiment (2-1)

In the weighing device 100, if there is a gripper 30 for which the weight of the article A gripped thereby was not selected for the combination, the articles A gripped by the gripper 30 not selected for the combination are returned to the article group accommodation container 52, whereupon the articles A gripped by the grippers 30 selected for the combination are discharged to the discharge chute 60. As a result, articles A gripped by grippers 30 not selected for the combination do not spill out from the grippers 30 and are not discharged to the discharge chute 60, and weighing precision can be improved.

(2-2)

In the weighing device 100, when there is no combination for which the target weight value is reached, the control unit 70 discharges all of the articles gripped by the gripping units to the article group accommodation container 52.

(3) Modification of Second Embodiment

Figure 8B:
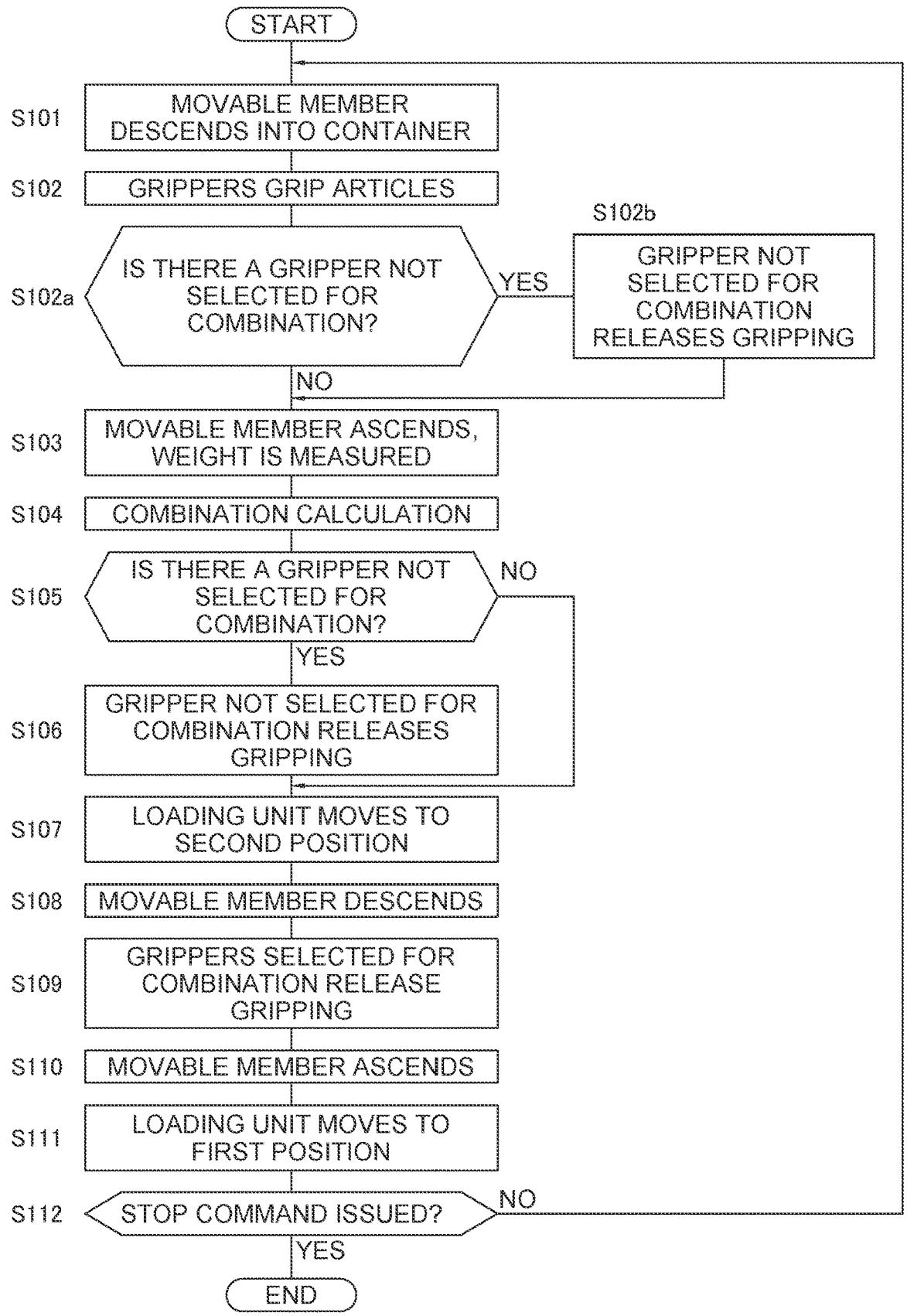
FIG. 8B is a flowchart for explaining the operation of a weighing device according to a modification of the second embodiment.

FIG. 8B is a flowchart for explaining the operation of the weighing device 100 according to a modification of the second embodiment. In FIG. 8B, the difference between the modification and FIG. 8A is that a step S102a and a step S102b are inserted between step S102 and step S103.

Steps S101, S102, and S103 to S112 in FIG. 8B are the same as those in FIG. 8A, and these steps are therefore not described here. The newly inserted step S102a and step S102b are described here.

(Step S102a)

In step S102a, the control unit 70 determines whether there is a gripper 30 not selected for the combination among the grippers 30.

Here, "not selected for the combination among the grippers 30" involves fulfilling at least one of the following, i.e., excluding (1) from among prescribed conditions (1) to (3) described in step S4 of the first embodiment:

(2) the operating distance in an operation in which the articles A are held by the gripping members 32 is greater than a prescribed range; or (3) the operating distance in the operation in which the articles A are held by the gripping members 32 is less than the prescribed range.

Because it is possible in step S102 to determine whether the operating distance in the operation in which the articles A are held by the gripping members 32 is greater than or less than the prescribed range at the point in time when the control unit 70 causes the gripping members 32 to grip the articles A, it is not necessary for the control unit 70 to move the movable member 20 vertically upward as in the first embodiment and the second embodiment.

The control unit 70 proceeds to step S102b when it is determined that the operation state of the grippers 30 fulfills the prescribed condition (2) or (3), but proceeds to step S103 when it is determined that the operation state does not fulfill either prescribed condition.

(Step S102b)

Next, the control unit 70 controls the gripping member drive mechanisms 34 of the grippers 30 fulfilling at least one of the prescribed conditions (2) and (3) to cause said grippers 30 to release gripping of the articles A (see FIG. 6D).

In other words, if there is a gripper 30 for which the weight of the article A gripped thereby was not selected for the combination, the control unit 70 controls the gripping member driving mechanism 34 of said gripper 30 to cause the gripper 30 to release gripping of the article A according to the first operation.

The article A gripped by the gripper 30 is then dropped into the article group accommodation container 52 of the loading unit 50 disposed at the first position, and is reused as an article A of the article group A1. At this time, the first operation is completed for the gripping members 32 of grippers 30 that fulfilled the prescribed condition.

Moreover, immediately after gripping of the articles A has been released according to the first operation by the gripping members 32 of the grippers 30, the control unit 70 controls the gripping member drive mechanisms 34 of said grippers 30, and causes the gripping members 32 to execute the second operation. When the articles A are articles that do not readily adhere to the gripping members 32, the second operation does not necessarily need to be executed.

The articles A in the gripper 30 that fulfills at least one of conditions (2) and (3) being returned to the article group accommodation container 52 avoids a situation where the grippers 30 operate while still holding "articles A not selected for the combination." As a result, dropping of articles from the grippers 30 and reductions in weighing precision are suppressed. Furthermore, wasteful operation is eliminated, and production efficiency can be improved.

Other Configurations (A)

In the weighing device 100, when returning the articles A gripped by the grippers 30 to the article group accommodation container 52, the control unit 70 moves the grippers 30 and the article group accommodation container 52 relative to each other.

In such instances, if articles A are returned to the previous location at which the articles A were grasped, it is not very likely that a suitable amount will be obtained when articles A are subsequently grasped; therefore, moving the grippers 30 and the article group accommodation container 52 relative to each other and shifting the locations at which articles A are returned raises the likelihood of grasping a suitable amount of articles A.

(B)

In the weighing device 100, the article group accommodation container 52 is capable of moving in horizontal first and second directions that are orthogonal to each other. When returning the articles A gripped by the grippers 30 to the article group accommodation container 52, the control unit 70 causes the grippers 30 and the article group accommodation container 52 to move relative to each other in either of the first and second directions.

In such instances, the articles A are returned to the article group accommodation container 52 once the positional relationship between the grippers 30 and the article group accommodation container 52 is ascertained using planar coordinates, and therefore the articles can be returned in such a manner that the distribution of articles in the container is uniform.

(C)

In the weighing device 100, at least one of the grippers 30 and the article group accommodation container 52 is capable of rotating about a vertical axis. The control unit 70 causes the grippers 30 and the article group accommodation container 52 to perform relative rotation by a prescribed angle in plan view. This makes it possible to shift the locations at which articles A are returned, and to increase the likelihood of grasping a suitable amount of articles A.

(D)

In the first embodiment, the assessment as to whether the operating distance in the operation in which the articles A are held by the gripping members 32 is greater than or less than the prescribed range is made according to whether the smallest inscribed circle with respect to three gripping members 32 when an article A is sandwiched is further outward or further inward than the prescribed range R, i.e., according to the position (coordinates) reached by the gripping members 32.

However, if the gripping members 32 are in a fully open state when the gripping operation starts, then the operating distance by which the gripping members 32 are operated will be greater when the weight value of articles being gripped is less than the target weight value than when articles having the target weight value are gripped.

Conversely, the operating distance by which the gripping members 32 are operated will be less when the weight value of articles being gripped is greater than the target weight value than when articles having the target weight value are gripped.

Thus, in cases where the gripping members 32 are in a fully open state when the gripping operation starts, and the operating distance is conceived of as "displacement" with reference to the fully open state of the gripping members 32, "the operating distance in the operation in which the articles are held by the gripping units being greater than the prescribed range" signifies that the weight value of said articles is less than the target weight value. Moreover, "the operating distance in the operation in which the articles are held by the gripping units being less than the prescribed range" signifies that the weight value of said articles is greater than the target weight value.

REFERENCE SIGNS LIST

10 Robot arm
30 Gripper (gripping unit)
32 Gripping member (claw)
40 Weighing unit
52 Article group accommodation container (container)
60 Discharge chute
70 Control unit
100 Weighing device
A Article

CITATION LIST

Patent Literature

<Patent Document 1>Japanese Laid-Open Patent Publication No. H6-3182

The invention claimed is:

1. A weighing device configured to weigh articles of an article group accommodated in a container, the weighing device comprising:
a robot arm;
a gripping unit attached to a distal end of the robot arm, the gripping unit configured to grip a portion of the articles from the article group within the container;
a weighing unit configured to measure a weight value of the articles gripped by the gripping unit; and
a control unit configured to:
control operation of the gripping unit,
determine whether a prescribed condition is fulfilled by at least one of an operating distance of the gripping unit and a weighing result from the weighing unit, and
in response to determining that the prescribed condition is fulfilled, control operation of the gripping unit so as to return the articles gripped by the gripping unit to the container rather than discharging to a target discharge destination.

2. The weighing device according to claim 1, wherein:
the weighing device furthermore comprises
a plurality of the gripping units, and
a plurality of the weighing units; and
when a prescribed condition is fulfilled by at least one of the operating distance of any gripping unit from among the plurality of gripping units and the weighing result from the weighing unit corresponding to the gripping unit, the control unit is configured to control operation of the gripping unit so as to return the article gripped by the gripping unit fulfilling the prescribed condition to the container without than discharging to the discharge destination.

3. The weighing device according to claim 1, wherein:
the weighing device furthermore comprises
a plurality of the gripping units,
a plurality of the weighing units, and
a discharge chute configured to receive and discharge the articles discharged from the gripping units;
the control unit is configured to perform a combination calculation using the weight value of the articles gripped by each of the plurality of gripping units, and to select a combination for which a preset target weight value is reached; and
furthermore, when a prescribed condition is fulfilled by the weighing result from a weighing unit corresponding to at least one gripping unit from among the plurality of gripping units, the control unit is configured to control operation of the gripping unit so as to return the articles gripped by the gripping unit fulfilling the prescribed condition to the container whereupon the control unit is configured to control operation of the gripping unit so as to discharge the articles gripped by gripping unit not fulfilling the prescribed condition to the discharge chute.

4. The weighing device according to claim 1, wherein the prescribed condition includes the weight value of the articles weighed by the weighing unit not being a preset target weight value.

5. The weighing device according to claim 1, wherein the prescribed condition includes an operating distance in an operation in which the articles are held by the gripping unit being greater than a prescribed range.

6. The weighing device according to claim 1, wherein the prescribed condition includes an operating distance in an operation in which the articles are held by the gripping unit being less than a prescribed range.

7. The weighing device according to claim 5, wherein:
the gripping units have at least two claws to grasp the articles; and
the operating distance is a degree to which the two claws open.

8. The weighing device according to claim 3, wherein the prescribed condition includes the weighing result not being selected for the combination for which the target weight value is reached.

9. The weighing device according to claim 8, wherein when there is no combination for which the target weight value is reached, the control unit is configured to discharge all of the articles gripped by the gripping units to the container.

10. The weighing device according to claim 1, wherein when returning the articles gripped by the gripping unit to the container, the control unit is configured to cause the gripping unit and the container to move relative to each other.

11. The weighing device according to claim 1, wherein:
the container is configured to moving in horizontal first and second directions that are orthogonal to each other; and
when returning the articles gripped by the gripping unit to the container, the control unit is configured to cause the gripping unit and the container to move relative to each other in either of the first and second directions.

12. The weighing device according to claim 1, wherein:
at least one of the gripping unit and the container is configured to rotating about a vertical axis; and
the control unit is configured to cause the gripping unit and the container to perform relative rotation by a prescribed angle in plan view.

* * * * *